(12) United States Patent
Kakimoto

(10) Patent No.: US 9,143,079 B2
(45) Date of Patent: Sep. 22, 2015

(54) POWER CONVERTER

(71) Applicant: DENSO CORPORATION, Kariya, Aichi-pref. (JP)

(72) Inventor: Noriyuki Kakimoto, Obu (JP)

(73) Assignee: DENSO CORPORATION, Kariya (JP)

( * ) Notice: Subject to any disclaimer, the term of this patent is extended or adjusted under 35 U.S.C. 154(b) by 193 days.

(21) Appl. No.: 13/926,001

(22) Filed: Jun. 25, 2013

(65) Prior Publication Data

US 2014/0001839 A1    Jan. 2, 2014

(30) Foreign Application Priority Data

Jun. 27, 2012  (JP) .................................. 2012-144406

(51) Int. Cl.
| | |
|---|---|
| *H03K 5/00* | (2006.01) |
| *H02P 27/06* | (2006.01) |
| *H02P 27/08* | (2006.01) |
| *H02M 1/32* | (2007.01) |
| *H02M 1/38* | (2007.01) |
| *H02M 7/5387* | (2007.01) |

(52) U.S. Cl.
CPC ............. *H02P 27/06* (2013.01); *H02M 1/32* (2013.01); *H02M 1/38* (2013.01); *H02M 7/53871* (2013.01); *H02P 27/08* (2013.01)

(58) Field of Classification Search
USPC ............ 318/400.26, 400.27, 400.28, 400.29, 318/400.3, 400.31, 400.32, 400.08, 400.13, 318/400.33; 363/40, 41, 55, 56.01, 56.02, 363/56.03, 56.04, 56.05, 98, 123, 124, 131, 363/132
See application file for complete search history.

(56) References Cited

U.S. PATENT DOCUMENTS

| | | | |
|---|---|---|---|
| 2001/0002782 A1 | 6/2001 | Shimane et al. | |
| 2005/0128671 A1* | 6/2005 | Miyamoto | ................. 361/118 |
| 2013/0009585 A1* | 1/2013 | Hashimoto | ................. 318/503 |

FOREIGN PATENT DOCUMENTS

| | | | |
|---|---|---|---|
| JP | 2003-134817 A | 5/2003 |
| JP | 2004-096318 A | 3/2004 |
| JP | 2006-158001 A | 6/2006 |
| JP | 2006-320177 A | 11/2006 |
| JP | 2008-278584 A | 11/2008 |
| JP | 2010-045925 A | 2/2010 |

OTHER PUBLICATIONS

Office Action mailed Apr. 22, 2014 in the corresponding JP Application No. 2012-144406. (English Translation).
Office Action mailed Jan. 20, 2015 in the corresponding JP Application No. 2012-144406. (English Translation).

* cited by examiner

*Primary Examiner* — Nguyen Tran
(74) *Attorney, Agent, or Firm* — Posz Law Group, PLC

(57) ABSTRACT

A power converter includes an output circuit and a control circuit. The output circuit has an upper switching device connected to a direct-current power source and a lower switching device connected in series with the upper switching device. The output circuit supplies power to a load from a connection point between the switching devices. The control circuit supplies pulse-modulated control signals to the switching devices to turn ON and OFF the switching devices. The control circuit variably sets a switching speed and a dead-time of the switching devices in such a manner that as the switching speed becomes slower, the dead-time becomes longer.

11 Claims, 20 Drawing Sheets

| TEMPERATURE | BREAKDOWN VOLTAGE | ALLOWABLE SURGE | ALLOWABLE LOSS |
|---|---|---|---|
| HIGH | HIGH | LARGE | SMALL |
| LOW | LOW | SMALL | LARGE |

| TEMPERATURE | SW SPEED | DEAD-TIME |
|---|---|---|
| HIGH | FAST | SHORT |
| LOW | SLOW | LONG |

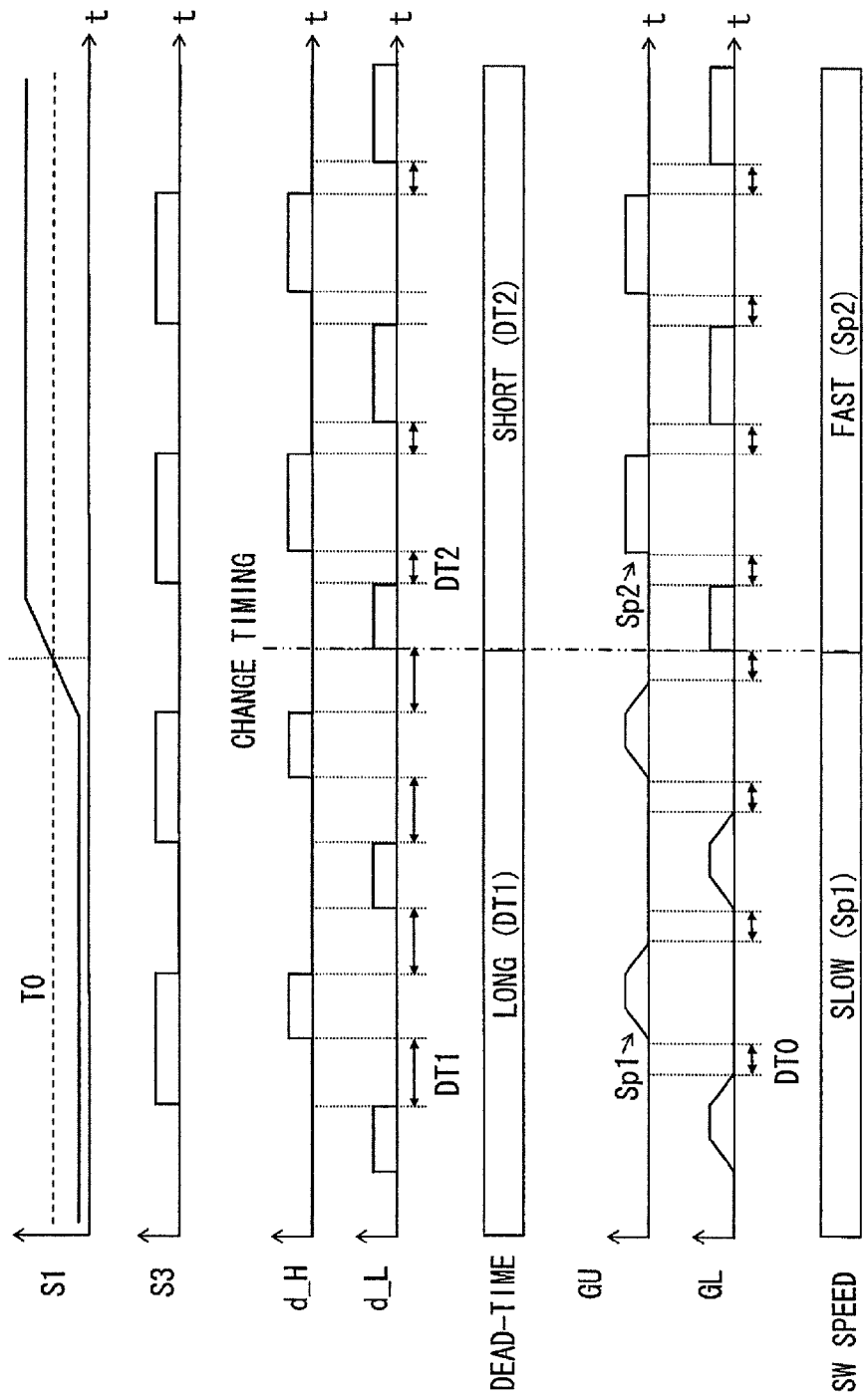

FIG. 4A
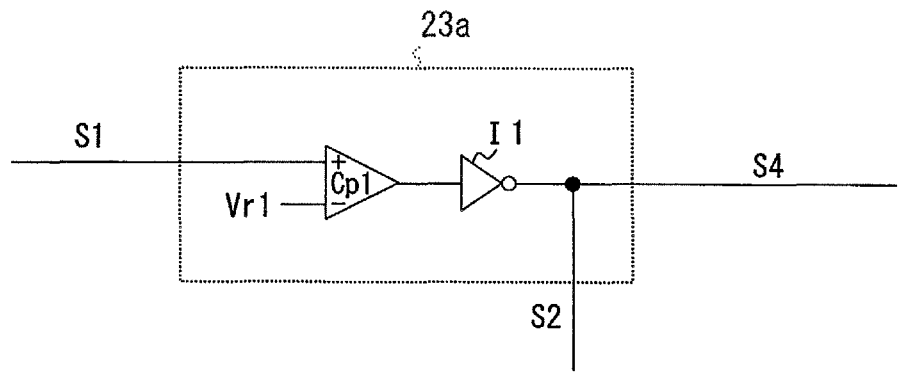
FIG. 4B
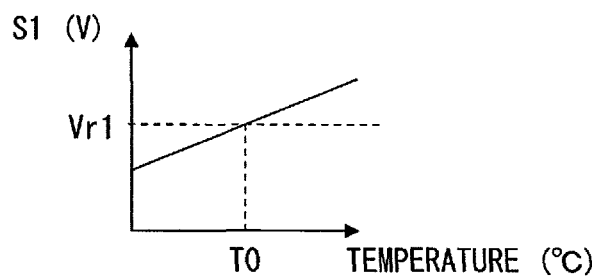
FIG. 4C
| OUTPUT OF I 1 | SW SPEED | DEAD-TIME |
|---|---|---|
| L | FAST | SHORT |
| H | SLOW | LONG |

FIG. 15A

| INPUT VOLTAGE | ALLOWABLE SURGE | REQUIRED MODULATION FACTOR | CONDUCTION LOSS | ALLOWABLE SW LOSS |
|---|---|---|---|---|
| LOW | LARGE | LARGE | LARGE | SMALL |
| HIGH | SMALL | SMALL | SMALL | LARGE |

FIG. 15B

| INPUT VOLTAGE | SW SPEED | DEAD-TIME |
|---|---|---|
| LOW | FAST | SHORT |
| HIGH | SLOW | LONG |

| DEAD-TIME | VOLTAGE UTILIZATION FACTOR |
|---|---|
| 3 μs | 0.814 |
| 2 μs | 0.831 |

| OUTPUT OF Cp2 | SW SPEED | DEAD-TIME |
|---|---|---|
| L | FAST | SHORT |
| H | SLOW | LONG |

| LOAD CURRENT | LOSS | ALLOWABLE SURGE |
|---|---|---|
| SMALL | SMALL | LARGE |
| LARGE | LARGE | SMALL |

| OUTPUT OF LOGIC | SW SPEED | DEAD-TIME |
|---|---|---|
| L | FAST | SHORT |
| H | SLOW | LONG |

FIG. 20A
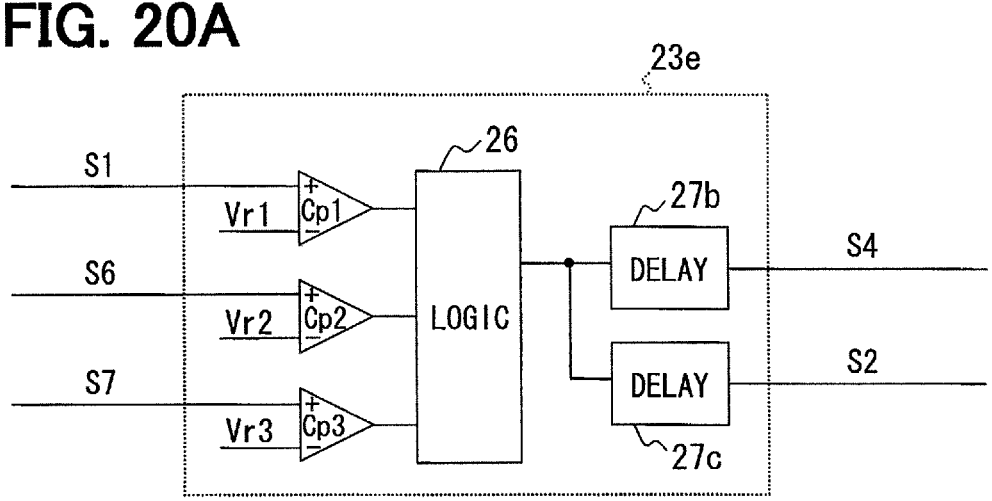
FIG. 20B
| OUTPUT OF LOGIC | SW SPEED | DEAD-TIME |
| --- | --- | --- |
| L | FAST | SHORT |
| H | SLOW | LONG |
FIG. 21A
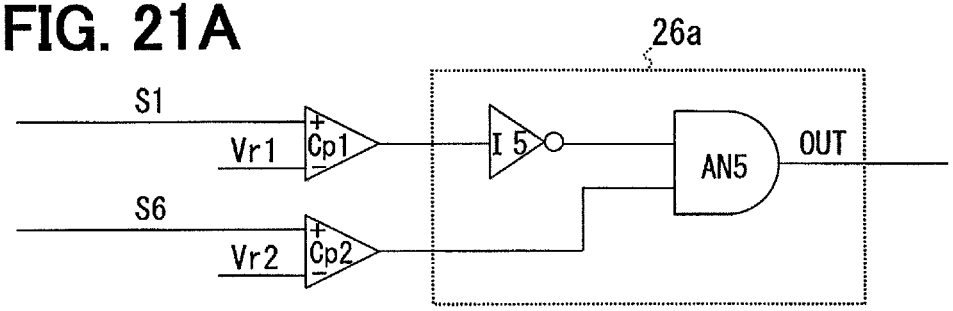
FIG. 21B
| S1 | S6 | OUT |
| --- | --- | --- |
| L | L | L |
| L | H | H |
| H | L | L |
| H | H | L |

| S1 | S6 | S7 | OUT |
|---|---|---|---|
| L | L | L | L |
| L | L | H | L |
| L | H | L | L |
| L | H | H | H |
| H | L | L | L |
| H | L | H | L |
| H | H | L | L |
| H | H | H | L |

POWER CONVERTER

CROSS REFERENCE TO RELATED APPLICATION

This application is based on Japanese Patent Application No. 2012-144406 filed on Jun. 27, 2012, the contents of which are incorporated herein by reference.

FIELD

The present disclosure relates to a power converter that includes a series circuit of two switching devices connected to a direct-current power source and supplies power to a load from a connection point between the switching devices.

BACKGROUND

US 2001/0002782 corresponding to JP-A-2001-169407 discloses a power converter used for control of a motor which is mounted on an electric vehicle to drive the vehicle. The power converter includes an inverter circuit to convert direct-current (DC) power to alternating-current (AC) power.

Generally, an inverter circuit used for control of a motor is connected to a DC power source and includes upper and lower switching devices that are connected in series to form a so-called leg of the inverter circuit. The inverter circuit supplies power to an inductive load from a connection point between the upper and lower switching devices. For example, an inverter circuit for a three-phase motor has three legs that are connected in a bridge configuration. PWM signals are applied to switching devices of the inverter circuit, and the switching devices are switched ON and OFF in accordance with the PWM signals. Thus, the inverter circuit generates AC power from the DC power source.

In an inverter circuit that drives an inductive load, a diode is connected in antiparallel with each switching device. When one of upper and lower switching devices is turned OFF, an electric current circulates through the inductive load and the diode of the other of the upper and lower switching devices. Typically, a dead-time, where both the upper and lower switching devices are kept OFF, is provided to prevent the upper and lower switching from being ON at the same time, thereby avoiding a short-circuit in a power source.

In practice, a power converter including an inverter circuit is required to achieve a stable and efficient operation by overcoming two challenges that have a trade-off relationship. The first challenge is to protect a switching device from a surge voltage. The second challenge is to reduce loss. Specifically, in a switching device such as an IGBT or a power MOS transistor used in an inverter circuit, although a switching loss (i.e., heat generation) decreases with an increase in a switching speed, a surge voltage increases with the increase in the switching speed. That is, as the switching speed at which the switching device is turned ON and OFF in accordance with the PWM signal becomes faster, the surge voltage becomes larger. When the surge voltage exceeds an allowable breakdown voltage of the switching device, the switching device is broken. Therefore, to ensure a stable operation of the switching device, the switching speed is so slow that the surge voltage can be smaller than the breakdown voltage. One approach to reduce the switching speed is to connect an input resistor (i.e., gate resistor) in series with a gate of the switching device so that rising and falling edges of a waveform of a gate signal can be smoothed. However, this approach increases a switching loss, and therefore it is difficult to achieve an efficient operation of the switching device. Further, since the increase in the switching loss causes an increase in heat generated in the switching device, there is a possibility that a temperature of the switching device exceeds an allowable temperature of the switching device. For these reasons, if it is impossible to set the switching speed to satisfy both the allowable breakdown voltage and the allowable temperature, there is a need to increase the breakdown voltage and/or the size of the switching device. As a result, the size and cost of the switching device are increased.

In a technique disclosed in US 2001/0002782, the switching speed is changed based on the temperature of the switching device to protect the switching device from the surge voltage and to reduce the switching loss. However, according to the technique, the dead-time is determined based on when the switching speed is slow. Therefore, when the switching speed is fast, the dead-time is too long. The excessive dead-time degrades a voltage utilization factor of a power converter and also causes a ripple in output voltage. Therefore, for example, when the technique is applied to a power converter for a motor, an available RPM-torque range of the motor may be narrowed, and also quietness may be degraded due to a torque ripple.

SUMMARY

In view of the above, it is an object of the present disclosure to provide a power converter for achieving a stable and efficient operation without increases in size and cost.

According to an aspect of the present disclosure, a power converter includes an output circuit and a control circuit. The output circuit has an upper switching device connected to a direct-current power source and a lower switching device connected in series with the upper switching device. The output circuit supplies power to a load from a connection point between the switching devices. The control circuit supplies pulse-modulated control signals to the switching devices to turn ON and OFF the switching devices. The control circuit variably sets a switching speed and a dead-time of the switching devices. When the switching speed is set to a first speed, the dead-time is set to a first time length. When the switching speed is set to a second speed faster than the first speed, the dead-time is set to a second time length shorter than the first time length.

BRIEF DESCRIPTION OF THE DRAWINGS

The above and other objects, features and advantages of the present disclosure will become more apparent from the following detailed description made with reference to the accompanying drawings. In the drawings:

FIG. 3 is a timing chart of the power converter;

FIG. 4A is a diagram showing a specific example of a determination circuit of the power converter, FIG. 4B is a diagram showing a relationship between a temperature signal and a temperature, and FIG. 4C is a diagram illustrating a relationship between an output of an NOT gate and the settings of the switching speed and the dead-time;

FIG. 15A shows necessary characteristics of switching devices to drive a motor on an input voltage, and FIG. 15B is a diagram showing settings of a switching speed and a dead-time of switching devices;

FIG. 20A is a diagram showing a third specific example of the determination circuit shown in FIG. 14, and FIG. 20B is a diagram showing a relationship between an output of a logic circuit and the settings of the switching speed and the dead-time;

FIG. 21A is a diagram showing a first specific example of the logic circuit shown in FIGS. 19A and 20A, and FIG. 21B is a diagram showing a logic table of the logic circuit shown in FIG. 21A.

DETAILED DESCRIPTION

Embodiments of the present disclosure are described below with reference to the drawings.

First Embodiment

Figure 1:
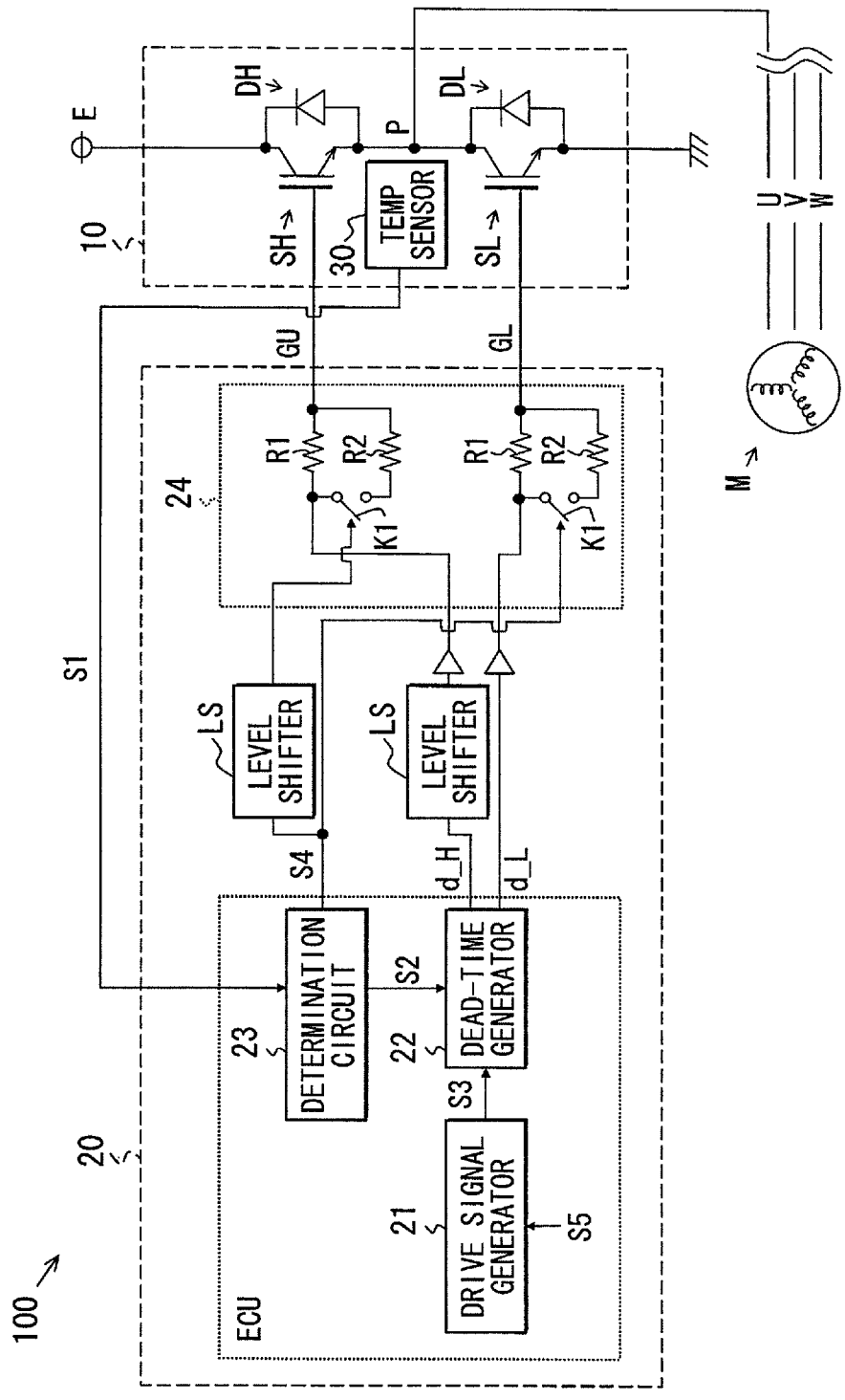
FIG. 1 is a block diagram of a power converter according to a first embodiment of the present disclosure.

FIG. 1 illustrates a block diagram of a power converter 100 according to a first embodiment of the present disclosure.

The power converter 100 serves as an inverter circuit for converting DC power to AC power. The power converter 100 includes an output circuit 10 and a gate control circuit 20.

The output circuit 10 has an upper switching device SH and a lower switching device SL. For example, the upper switching device SH and the lower switching device SL can be IGBTs or power MOS transistors. The upper switching device SH and the lower switching device SL are connected in series to form a U-phase leg between a DC power source E and a ground. A diode DH is connected in antiparallel with the upper switching device SH. A diode DL is connected in antiparallel with the lower switching device SL.

The AC power is supplied to a U-phase of a three-phase motor M, which is an inductive load, from a connection point P between the upper switching device SH and the lower switching device SL (i.e., from a connection point between the diode DH and the diode DL). Although not shown in the drawings, the output circuit 10 further includes a V-phase leg and a W-phase leg. The V-phase leg and the W-phase leg are configured in the same manner as the U-phase leg. The U-phase leg, the V-phase leg, and the W-phase leg are connected in a bridge configuration. For the sake of simplicity, explanations regarding the V-phase leg and the W-phase leg are left out in the following description. The upper switching device SH and the lower switching device SL of the output circuit 10 are turned ON and OFF in accordance with pulse-modulated signals so that the AC power supplied to the motor M can be generated from the DC power source E.

When one of the upper switching device SH and the lower switching device SL is turned OFF, an electric current circulates through the motor M and the diode DH or DL which is connected in antiparallel with the other of the upper switching device SH and the lower switching device SL. A dead-time, which is a time period where both the upper switching device SH and the lower switching device SL are kept OFF, is provided to prevent the upper switching device SH and the lower switching device SL from being ON at the same time, thereby avoiding a short-circuit in the DC power source E. According to the first embodiment, the dead-time can be changed by the gate control circuit 20. That is, the dead-time is variable. Further, a switching speed (SW speed) of the upper switching device SH and the lower switching device SL can be changed by the gate control circuit 20.

Specifically, the gate control circuit 20 outputs a pulse-modulated gate signal GU and a pulse-modulated gate signal GL to the upper switching device SH and the lower switching device SL, respectively. According to the first embodiment, the pulse-modulated gate signals GU and GL are pulse-width modulation (PWM) signals. The gate control circuit 20 includes a drive signal generator 21, a dead-time generator 22, a determination circuit 23, and a switching speed switcher 24, and a level shifter LS. For example, the drive signal generator 21, the dead-time generator 22, and the determination circuit 23 can be incorporated in an electrical control unit (ECU) of a vehicle. The switching speed switcher 24 changes gate input resistances of the upper switching device SH and the lower switching device SL. The switching speed switcher 24 includes a resistor R1, a resistor R2, and a switch K1. The switch K1 changes a connection condition between the resistors R1 and R2. Specifically, when the switch K1 is turned ON (i.e., closed), the resistor R2 is connected in parallel with the resistor R1. In contrast, when the switch K1 is turned OFF (i.e., opened), the resistor R2 is disconnected from the resistor R1.

The power converter 100 further includes a temperature sensor 30 for detecting a temperature of the upper switching devices SH and the lower switching device SL. The temperature sensor 30 outputs a temperature signal S1 indicative of the detected temperature to the determination circuit 23 of the gate control circuit 20. For example, the temperature sensor 30 can be included in the output circuit 10. The determination circuit 23 outputs a dead-time change signal S2 to the dead-time generator 22. The dead-time generator 22 outputs drive signals d_H and d_L based on the dead-time change signal S2 and a PWM signal S3 inputted from the drive signal generator 21. The drive signals d_H and d_L are generated for the upper and lower switching devices SH and SL, respectively, to provide the dead-time. The determination circuit 23 further outputs a switching speed change signal S4 to the switching speed switcher 24. The switching speed change signal S4 turns ON and OFF the switch K1 to change the connection condition between the resistors R1 and R2, thereby setting a predetermined switching speed to the drive signals d_H and d_L inputted from the dead-time generator 22. A RPM/torque command signal S5 is inputted to the drive signal generator 21, and the drive signal generator 21 outputs the PWM signal S3 based on the RPM/torque command signal S5.

As described below, according to the first embodiment, when the switching speed is set to a slower speed, the dead-time is set to a longer time length, and when the switching speed is set to a faster speed, the dead-time is set to a shorter time length.

Figures 2A, 2B, 2C:
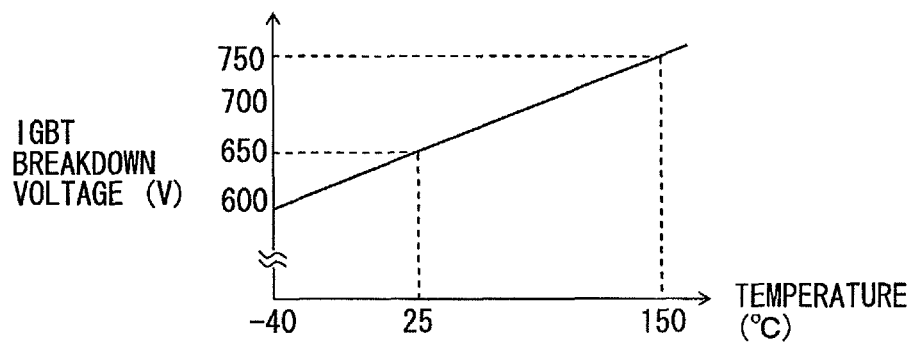
FIG. 2A is a diagram showing temperature characteristics of a typical switching device.
FIG. 2B is a diagram showing a temperature characteristic of an IGBT.
FIG. 2C is a diagram showing settings of a switching speed and a dead-time of switching devices of the power converter.

FIG. 2A shows temperature characteristics of a typical switching device such as an IGBT or a power MOSFET. As shown in FIG. 2A, as a temperature of the switching device becomes higher, a breakdown voltage of the switching device becomes higher, an allowable surge voltage of the switching device becomes larger, and an allowable loss of the switching device becomes smaller. For example, as shown in FIG. 2B, as a temperature of an IGBT becomes higher, an allowable breakdown voltage of the IGBT becomes larger.

FIG. 2C shows settings of the switching speed and the dead-time of the switching devices SH and SL of the power converter 100 according to the first embodiment. According to the first embodiment, when the temperature of the switching devices SH and SL is lower than a predetermined threshold temperature, the switching speed is set to a first speed, and the dead-time is set to a first time length. In contrast, when the temperature of the switching devices SH and SL is not lower than the threshold temperature, the switching speed is set to a second speed faster than the first speed, and the dead-time is set to a second time length shorter than the first time length.

FIG. 3 shows a timing chart of the power converter 100 and illustrates the temperature signal S1, the PWM signal S3, the drive signal d_H, the drive signal d_L, the dead-time, the gate signal GU, the gate signal GL, and the switching speed.

As described above, in the output circuit 10 of the power converter 100, the upper and lower switching devices SH and SL are connected in series between the DC power source E and the ground, and the AC power is supplied to the three-phase motor M from the connection point P between the upper switching device SH and the lower switching device SL. In such a circuit configuration, as discussed in the BACKGROUND section of the specification, two challenges having a trade-off relationship need to be overcome to achieve a stable and efficient operation. The first challenge is to protect the switching devices SH and SL from a surge voltage, and the second challenge is to reduce a switching loss (i.e., heat generation) of the switching devices SH and SL. That is, in a switching device such an IGBT or a power MOS transistor, although a switching loss decreases with an increase in a switching speed, a surge voltage increases with the increase in the switching speed. Therefore, as the switching speed becomes faster, the switching device is broken more easily.

However, if the switching speed is reduced, the switching loss becomes large. Accordingly, an operational efficiency is reduced. Therefore, as far as the surge voltage is smaller than an allowable breakdown voltage of the switching device, the switching speed needs to be increased as much as possible to reduce the switching loss.

The present inventors have focused on the fact that the breakdown voltage of the switching device varies depending on the temperature of the switching device. That is, as shown in FIG. 2A, as the temperature becomes higher, the breakdown voltage becomes higher. By using this temperature dependence of the breakdown voltage of the switching device, the switching speed of the switching device is set as fast as possible at each temperature while keeping the surge voltage smaller than the breakdown voltage. When the switching speed of the switching device is set as fast as possible, the dead-time, where both the upper switching device and the lower switching device are kept OFF, is reduced so that the total voltage utilization factor of the power converter can be improved.

As mentioned above, according to the first embodiment, the dead-time can be changed by the gate control circuit 20 which outputs the PWM gate signal GU and the PWM gate signal GL to the upper switching device SH and the lower switching device SL, respectively. Further, the switching speed of the upper switching device SH and the lower switching device SL can be changed by the gate control circuit 20. Specifically, as shown FIG. 2C, when the temperature of the switching devices SH and SL is not lower than the threshold temperature, the switching speed is set to a faster speed, and the dead-time is set to a shorter time length. In contrast, when the temperature of the switching devices SH and SL is lower than the threshold temperature, the switching speed is set to a slower speed, and the dead-time is set to a longer time length. In such an approach, the switching speed is set as fast as possible at each temperature while keeping the surge voltage smaller than the breakdown voltage. Thus, the dead-time is reduced as much as possible. This approach allows a general switching device to be used for the switching devices SH and SL. In other words, there is no need to use a specialized switching device with a high breakdown voltage and a large size for the switching devices SH and SL. Therefore, an increase in the size and cost of the switching devices SH and SL can be avoided.

For example, according to the first embodiment, as shown in the timing chart of FIG. 3, in a lower temperature condition where the temperature of the switching devices SH and SL is lower than a threshold temperature T0, the switching speed is set to a first speed Sp1, and the dead-time is set to a first time length DT1. In contrast, in a higher temperature condition where the temperature of the switching devices SH and SL is not lower than the threshold temperature T0, the switching speed is set to a second speed Sp2 faster than the first speed Sp1, and the dead-time is set to a second time length DT2 shorter than the first time length DT1. In such an approach, while the surge voltage is kept smaller than the breakdown voltage in the lower temperature condition, the switching loss and the temperature increase are reduced as much as possible in the higher temperature condition. As can be seen from FIG. 3, each of the first time length DT1 and the second time length DT2 is defined as a dead-time when both the drive signals d_H and d_L are OFF. The first time length DT1 and the second time length DT2 are adjusted according to an actual dead-time DT0 where both the gate signals GU and GL are OFF. In an example shown in FIG. 3, the switching speed and the dead-time are changed at the same time after the temperature of the switching devices SH and SL changes across the threshold temperature T0. Alternatively, there can be a delay between when the switching speed is changed and when the dead-time is changed. The first speed Sp1, the second speed Sp2, the first time length DT1, and the second time length DT2 are hereinafter sometimes referred to as the "slower speed Sp1", the "faster speed Sp2", the "longer time length DT1", and the "shorter time length DT2", respectively.

In the power converter 100, the determination circuit 23 of the gate control circuit 20 monitors the temperature of the switching devices SH and SL based on the temperature signal S1 from the temperature sensor 30. In the lower temperature condition, the switching speed switcher 24 and the dead-time generator 22 of the gate control circuit 20 set the switching speed to the slower speed Sp1 and set the dead-time to the longer time length DT1. In the higher temperature condition, the switching speed switcher 24 and the dead-time generator 22 of the gate control circuit 20 set the switching speed to the faster speed Sp2 and set the dead-time to the shorter time length DT2.

Alternatively, the temperature of the switching devices SH and SL can be estimated from a load condition of the switching devices SH and SL. For example, the load condition of the switching devices SH and SL can be detected based on signals inputted to the power converter 100.

As described above, according to the first embodiment, the temperature of the switching devices SH and SL is measured by the temperature sensor 30. In the lower temperature condition where the temperature of the switching devices SH and SL is lower than the threshold temperature T0, the gate control circuit 20 sets the switching speed to the slower speed Sp1 and sets the dead-time to the longer time length DT1 so that the surge voltage can be kept smaller than the breakdown voltage. In the higher temperature where the temperature of the switching devices SH and SL is not lower than the threshold temperature T0, the gate control circuit 20 sets the switching speed to the faster speed Sp2 and sets the dead-time to the shorter time length DT2 so that the switching loss can be reduced as much as possible.

In such an approach, the two challenges (i.e. to protect the switching devices SH and SL from the surge voltage and to reduce the switching loss of the switching devices SH and SL) having the trade-off relationship can be overcome by using a general switching device for the switching devices SH and SL. Further, since the temperature of the switching devices SH and SL is directly measured by the temperature sensor 30, the temperature of the switching devices SH and SL can be accurately measured. Therefore, the two challenges can be overcome in an efficient manner. Furthermore, since the dead-time is set according to the switching speed which is optimized at each temperature, the total voltage utilization factor of the power converter 100 is improved.

In the example shown in FIG. 3, the gate control circuit 20 changes the switching speed from the slower speed Sp1 to the faster speed Sp2 in a first transition from the low temperature condition to the high temperature condition. In contrast, the gate control circuit 20 changes the switching speed from the faster speed Sp2 to the slower speed Sp1 in a second transition from the high temperature condition to the low temperature condition. In the case of the first transition, it is preferable that the dead-time should be changed after the switching speed is changed. In the case of the second transition, it is preferable that the dead-time should be changed before the switching speed is changed. In such an approach, a delay between when the switching speed is changed and when the dead-time is changed is provided so that a short-circuit in the DC power source E can be surely prevented.

Further, the threshold temperature T0 can include a first threshold temperature and a second temperature different from the first threshold temperature. The first threshold temperature is used as a threshold for the first transition, and the second threshold temperature is used as a threshold for the second transition. Specifically, when the temperature of the switching devices SH and SL increases from below to above the first threshold temperature, the switching speed can be changed from the slower speed Sp1 to the faster speed Sp2, and the dead-time can be changed from the longer time length DT1 to the shorter time length DT2. Then, when the temperature of the switching devices SH and SL decreases from above to below the second threshold temperature, the switching speed can be changed from the faster speed Sp2 to the slower speed Sp1, and the dead-time can be changed from the shorter time length DT2 to the longer time length DT1.

In this way, in the power converter 100 according to the first embodiment, while the surge voltage is kept smaller than the breakdown voltage, the switching loss is reduced as much as possible. Thus, the power converter 100 achieves a stable and efficient operation without increases in size and cost.

Next, the determination circuit 23, the switching speed switcher 24, and the dead-time generator 22 of the power converter 100 are described in detail.

FIG. 4A illustrates a determination circuit 23a as a specific example of the determination circuit 23.

As shown in FIG. 4A, the determination circuit 23a includes a comparator Cp1 and an NOT gate (i.e., inverter) I1. The comparator Cp1 makes a comparison between the temperature signal S1 and a reference voltage Vr1. As shown in FIG. 4B, the reference voltage Vr1 corresponds to the threshold temperature T0 shown in FIG. 3. The comparator Cp1 outputs a logic high signal or a logic low signal based on a result of the comparison. An output signal of the comparator Cp1 is inputted to and logically inverted by the NOT gate I1. An output signal of the NOT gate is outputted as the switching speed change signal S4 and the dead-time change signal S2 from the determination circuit 23a. Specifically, as shown in FIG. 4C, when the NOT gate I1 outputs a logic low signal, the switching speed is set to the faster speed Sp2, and the dead-time is set to the shorter time length DT2. In contrast, when the NOT gate I1 outputs a logic high signal, the switching speed is set to the slower speed Sp1, and the dead-time is set to the longer time length DT1.

Figure 5A:
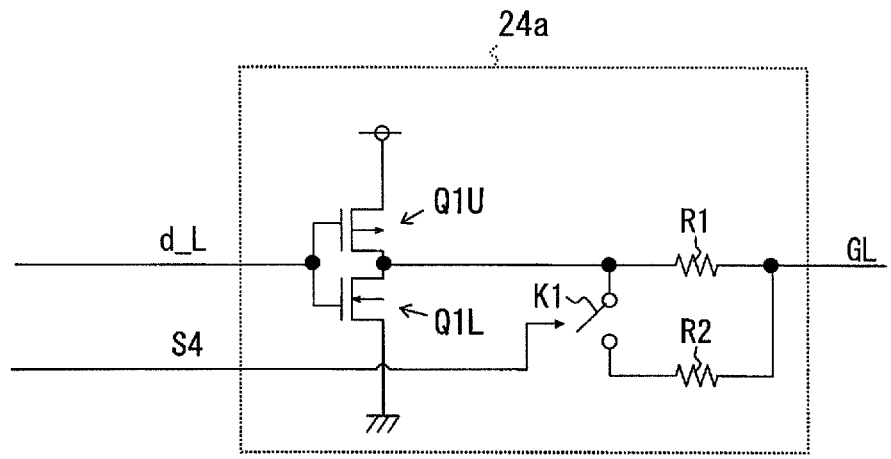
FIG. 5A is a diagram showing a specific first example of a switching speed switcher of the power converter.
Figure 5B:
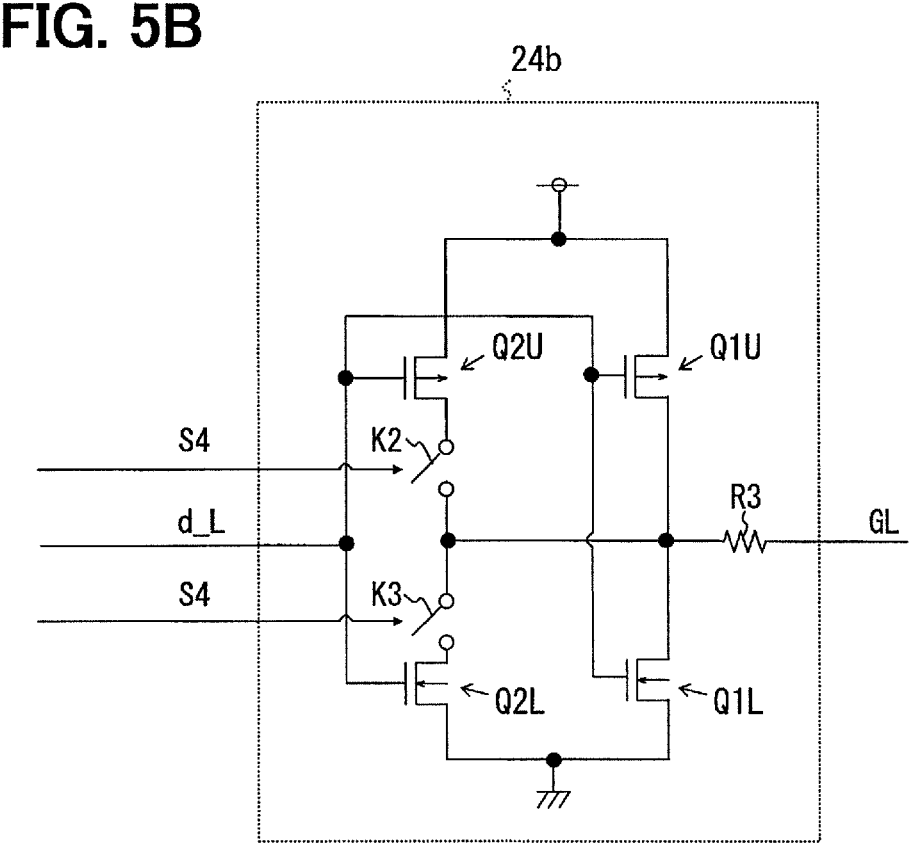
FIG. 5B is a diagram showing a specific second example of the switching speed switcher.

FIG. 5A illustrates a switching speed switcher 24a as a first specific example of the switching speed switcher 24. FIG. 5B illustrates a switching speed switcher 24b as a second specific example of the switching speed switcher 24.

As shown in FIG. 5A, the switching speed switcher 24a includes driving transistors Q1U and Q1L, the resistors R1 and R2, and the switch K1. As mentioned previously, the switch K1 is turned ON and OFF in accordance with the switching speed change signal S4 from the determination circuit 23 so that a gate input resistance of the lower switching device SL can be changed.

As shown in FIG. 5B, the switching speed switcher 24b includes the driving transistors Q1U and Q1L, driving transistors Q2U and Q2L, switches K2 and K3, and a resistor R3. The driving transistor Q1U is connected in parallel with the driving transistor Q2U through the switch K2. The driving transistor Q1L is connected in parallel with the driving transistor Q2L through the switch K3. The switches K2 and K3 are turned ON and OFF in accordance with the switching speed change signal S4 from the determination circuit 23 so that the number of the driving transistors connected in parallel can be changed. Thus, an ON-resistance of the switching speed switcher 24b is changed so that the switching speed of the lower switching device SL can be changed.

The specific examples shown in FIGS. 5A and 5B correspond to a lower part of the switching speed switcher 24 to apply the gate signal GL to the lower switching device SL. Although not shown in the drawings, an upper part of the switching speed switcher 24 to apply the gate signal GU to the upper switching device SH can be configured in the same manner as the lower part of the switching speed switcher 24.

Figure 6:
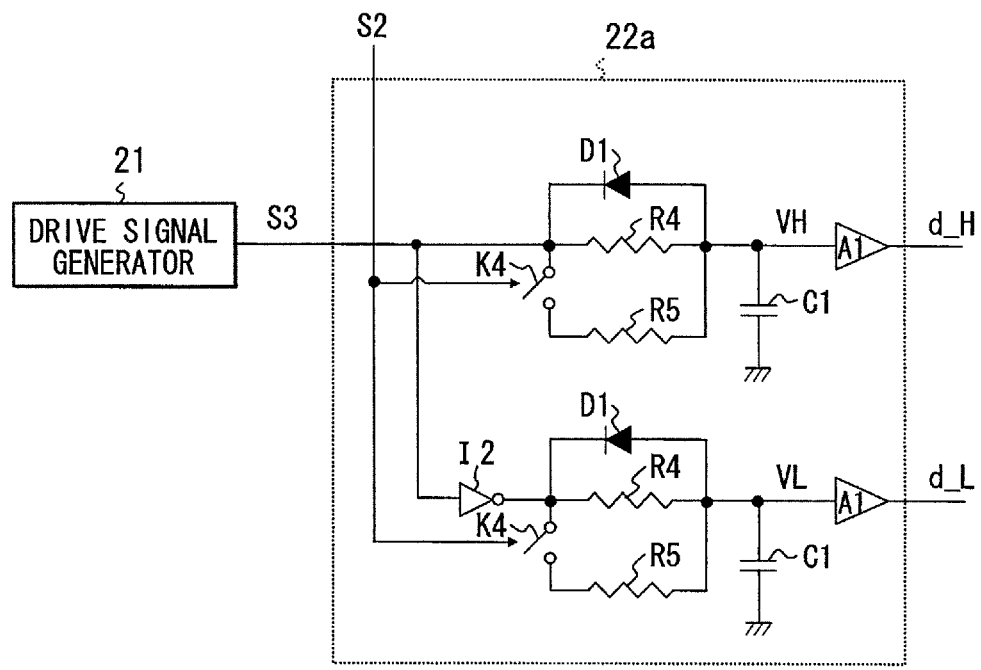
FIG. 6 is a diagram showing a specific first example of a dead-time generator of the power converter.

FIG. 6 illustrates a dead-time generator 22a as a first specific example of the dead-time generator 22. The dead-time generator 22a is configured as an analog circuit. An upper part of the dead-time generator 22a to output the drive signal d_H includes resistors R4 and R5, a capacitor C1, a diode D1, a switch K4, and an amplifier A1. The resistors R4 and R5 and the capacitor C1 are connected to form a RC circuit. The diode D1 is connected in antiparallel with the resistor R4. The switch K1 connects and disconnects the resistor R5 to and from the resistor R4. That is, the switch. K1 changes a connection condition of the resistor R5. The amplifier A1 receives a voltage waveform VH from the RC circuit and outputs the drive signal d_H.

As shown in FIG. 6, a lower part of the dead-time generator 22a to output the drive signal d_L is configured in almost the same manner as the upper part of the dead-time generator 22a. A difference between the upper part and the lower part of the dead-time generator 22a is that the lower part of the dead-time generator 22a further has an NOT gate (i.e., inverter) 12. The PWM signal S3 from the drive signal generator 21 is inputted directly to the RC circuit of the upper part of the dead-time generator 22a. In contrast, the PWM signal S3 is inputted through the NOT gate 12 to the RC circuit of the lower part of the dead-time generator 22a. Thus, a logic level of the PWM signal S3 inputted to the lower part of the dead-time generator 22 is opposite to the logic level of the PWM signal S3 inputted to the upper part of the dead-time generator 22. The switch K4 of each of the upper part and the lower part of the dead-time generator 22a is turned ON and OFF in accordance with the dead-time change signal S2 from the determination circuit 23.

Figure 7:
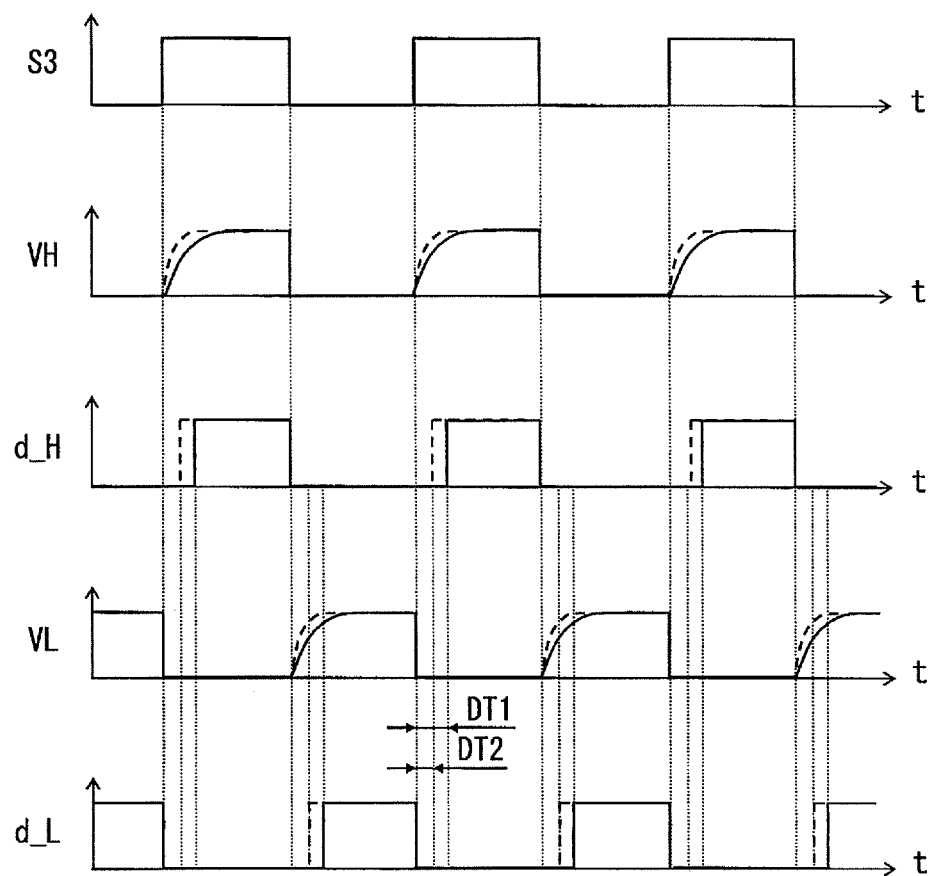
FIG. 7 is a timing chart of the dead-time generator shown in FIG. 6.

When the switch K4 is turned ON and OFF in accordance with the dead-time change signal S2, the connection condition of the resistor R5 is changed so that a time constant of the RC circuit can be changed. Accordingly, rise times of the voltage waveform VH and VL outputted from the RC circuits are changed. Then, the voltage waveform VH and VL are shaped by the amplifiers A1 into pulse waveforms corresponding to the drive signals d_H and d_L, respectively. Thus, as shown in FIG. 7, the dead-time can be changed between the longer time length DT1 and the shorter time length DT2.

Figure 8:
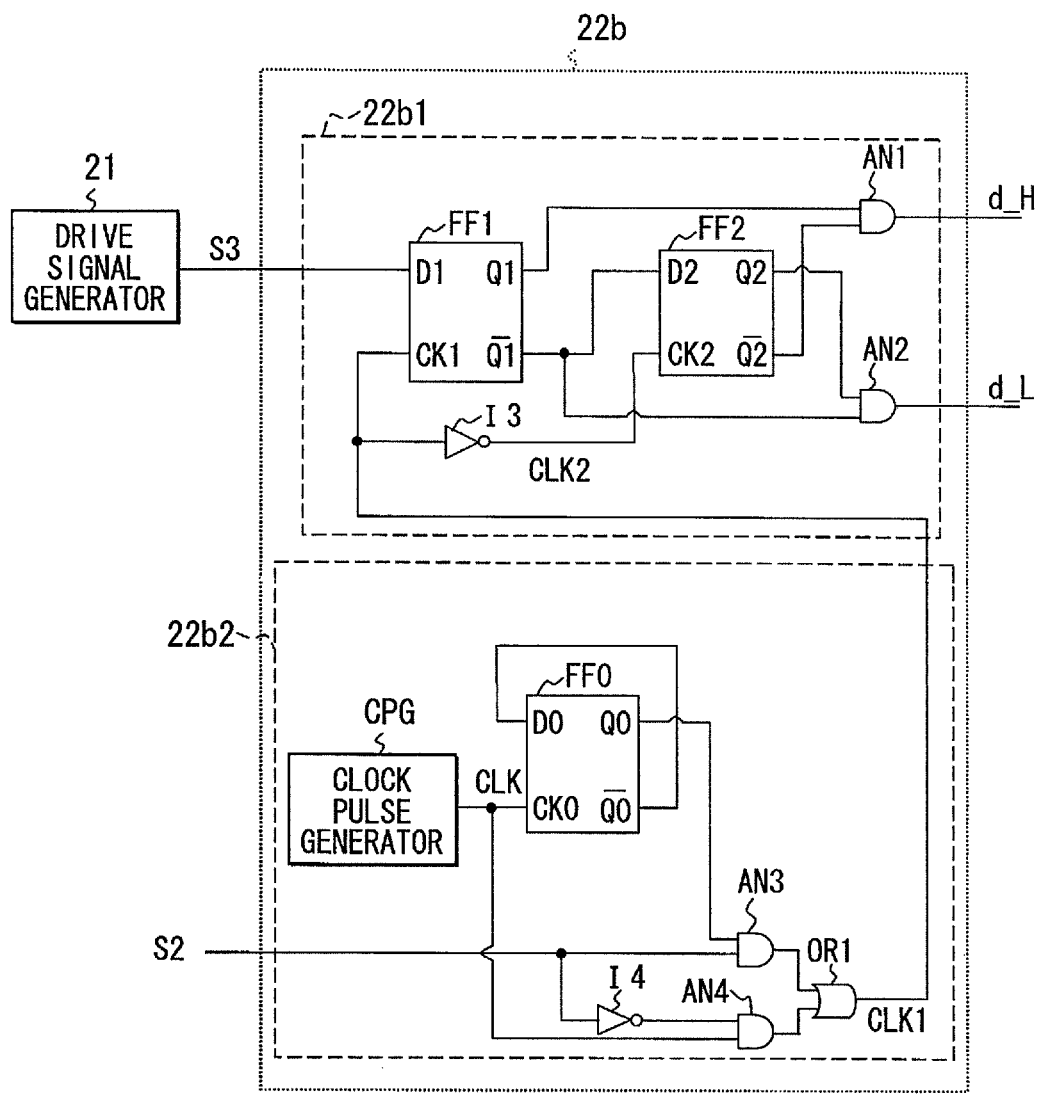
FIG. 8 is a diagram showing a second specific example of the dead-time generator.
Figure 9:
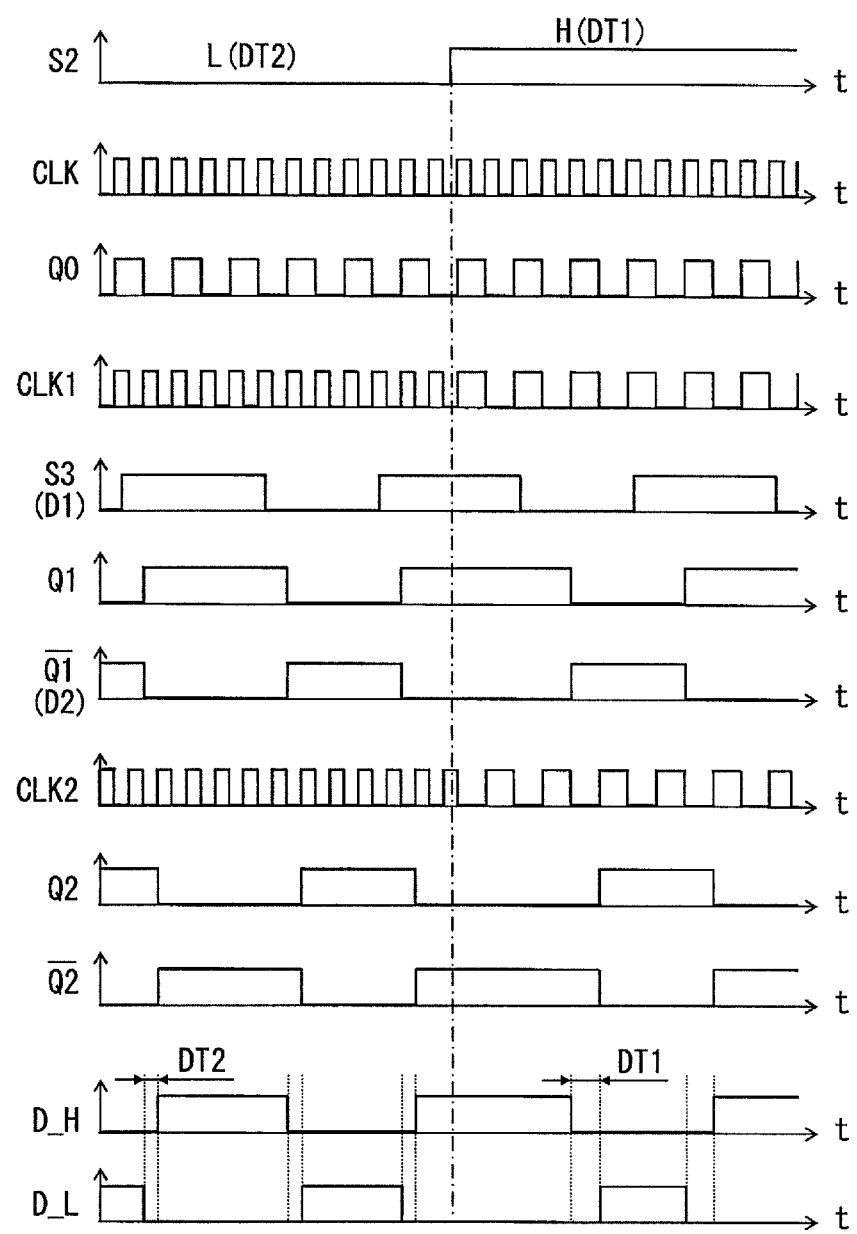
FIG. 9 is a timing chart of the dead-time generator 22 shown in FIG. 8.

FIG. 8 illustrates a dead-time generator 22b as a second specific example of the dead-time generator 22. The dead-time generator 22b is configured as a digital circuit. FIG. 9 is a timing chart of the dead-time generator 22b shown in FIG. 8.

The dead-time generator 22b includes a first section 22b1 and a second section 22b2. The first section 22b1 includes two flip-flops FF1 and FF2, two AND gates AN1 and AN2, and an NOT gate 13 for inverting a logic level of a clock signal CLK1 outputted from the second section 22b2. The second section 22b2 includes a flip-flop FF10, a clock pulse generator CPG, a NOT gate 14, two AND gates AN3 and AN4, and an OR gate OR1.

Operations of the dead-time generator 22b are described below with reference to FIGS. 8 and 9.

A logic low level of the dead-time change signal S2 acts as a command for setting the dead-time to the shorter time length DT2. In contrast, a logic high level of the dead-time change signal S2 acts as a command for setting the dead-time to the longer time length DT1. The clock pulse generator CPG generates a base clock signal CLK. The base clock signal CLK is inputted to a clock input CK0 of the flip-flop FF0. The flip-flop FF0 outputs a signal Q0 in response to the base clock signal CLK. As shown in FIG. 9, a period of the signal Q0 is twice as long as a period of the base clock signal CLK. When the dead-time change signal S2 is at a logic low level, the signal Q0 is outputted from the AND gate AN3. In contrast, when the dead-time change signal S2 is at a logic high level, the base clock signal CLK is outputted from the AND gate AN4. Therefore, the clock signal CLK1 outputted from the OR gate OR1 changes as shown in FIG. 9.

The clock signal CLK1 outputted from the OR gate OR1 is inputted directly to a clock input CK1 of the flip-flop FF1. In contrast, the clock signal CLK1 is inputted through the NOT gate 13 to a clock input CK2 of the flip-flop FF2. Thus, a logic level of a clock signal CLK2 inputted to the clock input CK2 of the flip-flop FF2 is opposite to a logic level of the clock signal CLK1 inputted to the clock input CK1 of the flip-flop FF1.

The PWM signal S3 from the drive signal generator 21 is inputted directly to an input D1 of the flip-flop. FF1. The flip-flop FF1 outputs a signal Q1 and an inverse signal of the signal Q1 in response to the PWM signal S3. Because of the clock signal CLK1, the signal Q1 has a predetermined time delay relative to the PWM signal S3. The inverse signal of the signal Q1 is inputted to an input D2 of the flip-flop FF2. The flip-flop FF2 outputs a signal Q2 and an inverse signal of the signal Q2 in response to the inverse signal of the signal Q1. Because of the clock signal CLK2, the signal Q2 has a predetermined time delay relative to the inverse signal of the signal Q1.

The AND gate AN1 performs an AND operation between the signal Q1 from the flip-flop FF1 and the inversion signal of the signal Q2 from the flip-flop FF2, thereby outputting the drive signal d_H. The AND gate AN2 performs an AND operation between the inversion signal of the signal Q1 from the flip-flop FF1 and the signal Q2 from the flip-flop FF2, thereby outputting the drive signal d_L. In this way, as shown in FIG. 9, when the dead-time change signal S2 is at a logic low level, the dead-time is set to the shorter time length DT2, and when the dead-time change signal S2 is at a logic high level, the dead-time is set to the longer time length DT1.

In the power converter 100, there is a need to change the switching speed and the dead-time at an appropriate timing to prevent a short-circuit in the DC power supply E and to provide the right amount of the dead-time. FIGS. 10, 11, 12, and 13 show examples of a control method performed in the gate control circuit 20 to change the switching speed and the dead-time at the appropriate timing. For the sake of simplicity, FIGS. 10-13 do not reflect the change in the switching speed and the dead-time to the gate signals GU and GL.

Figure 10:
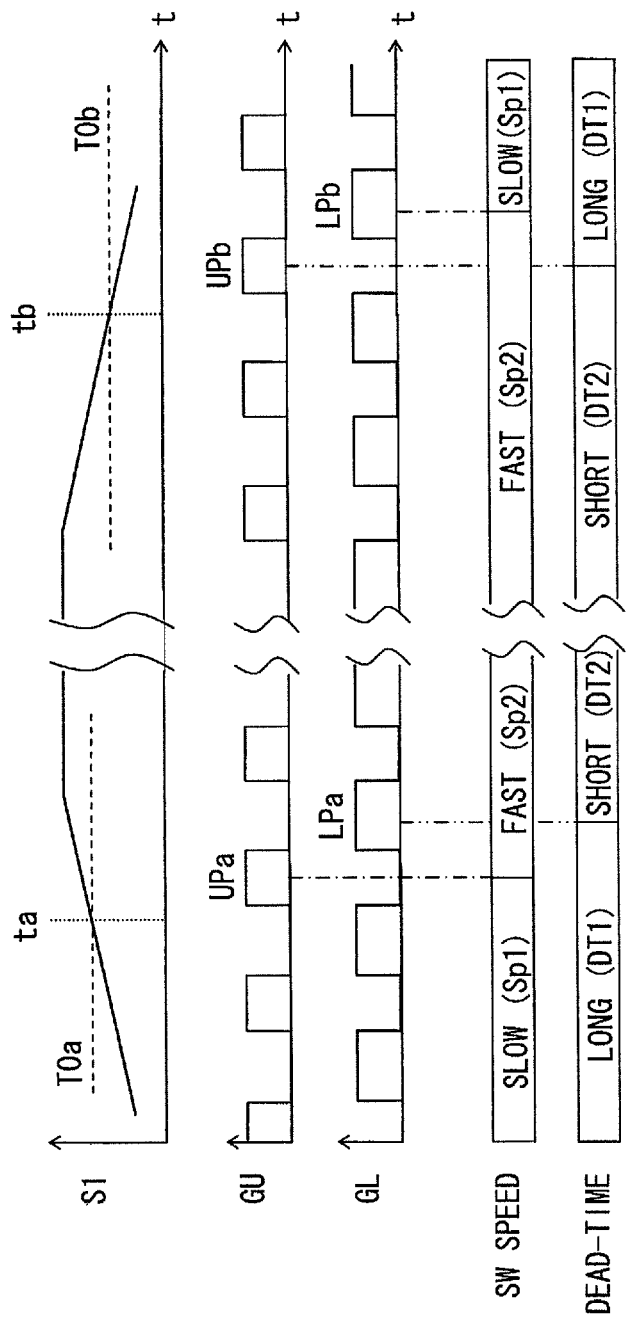
FIG. 10 is a timing chart of a first example of a control method to change the switching speed and the dead-time.

FIG. 10 shows a first example of the control method to change the switching speed and the dead-time.

In FIG. 10, a change timing of the switching speed is indicated by a dashed dotted line, and a changing timing of the dead-time is indicated by a dashed two-dotted line. As shown in FIG. 10, the change timing of the switching speed is displaced from the changing timing of the dead-time by one pulse of the gate signal GU or GL. Specifically, in the first transition from the low temperature condition to the high temperature condition, after the temperature signal S1 exceeds a threshold temperature T0a at a time ta, the switching speed is changed from the slower speed Sp1 to the faster speed Sp2 in response to a pulse UPa of the gate signal GU, and then the dead-time is changed from the longer time length DT1 to the shorter time length DT2 in response to a pulse LPa of the gate signal GL immediately after the pulse UPa. In contrast, in the second transition from the high temperature condition to the low temperature condition, after the temperature signal S1 falls below a threshold temperature T0b at a time tb, the dead-time is changed from the shorter time length DT2 to the longer time length DT1 in response to a pulse UPb of the gate signal GU, and then the switching speed is changed from the faster speed Sp2 to the slower speed Sp1 in response to a pulse LPb of the gate signal GL immediately after the pulse UPb. The control method shown in FIG. 10 surely prevents a short-circuit in the DC power source E and also improves a voltage utilization factor of the power converter 100 as much as possible.

Figure 11:
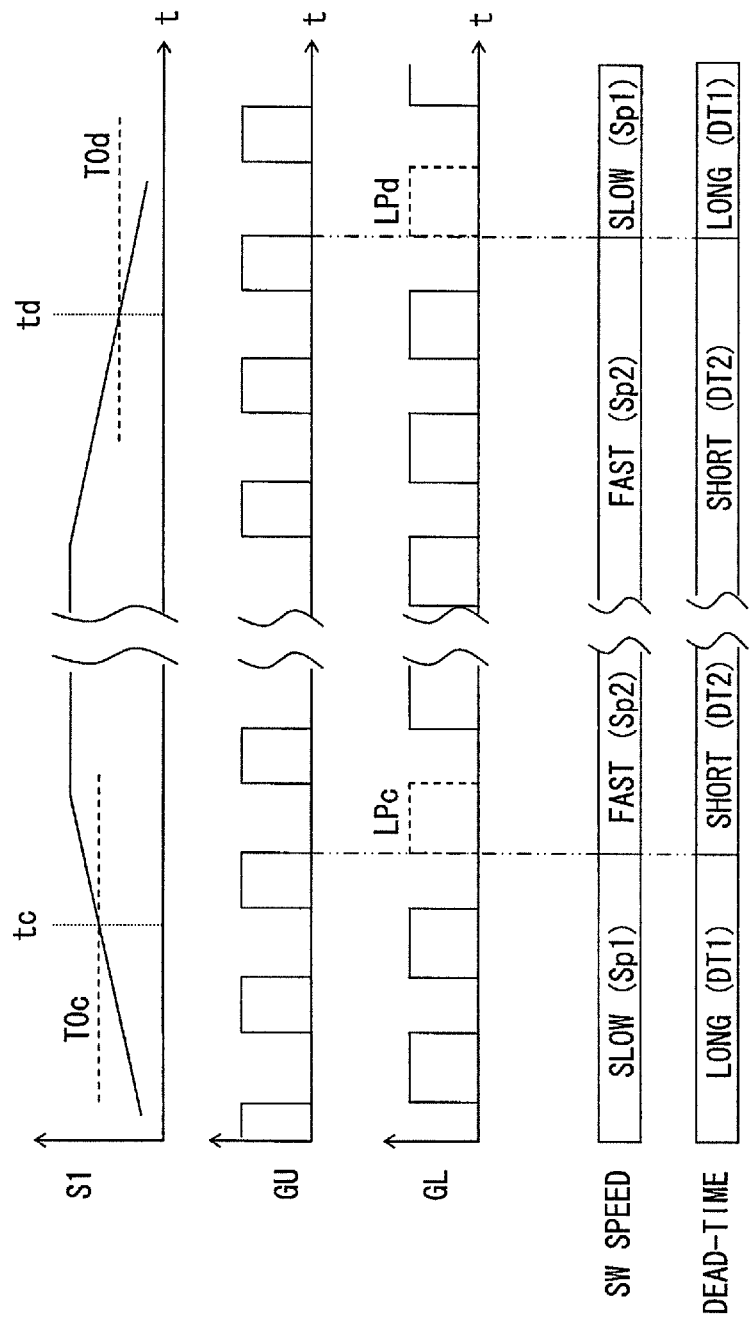
FIG. 11 is a timing chart of a second example of a control method to change the switching speed and the dead-time.

FIG. 11 shows a second example of the control method to change the switching speed and the dead-time.

As indicated by a dashed two-dotted line in FIG. 11, according to the second example, the switching speed and the dead-time are changed at the same timing during a time period where one pulse of the gate signal GL supplied to the lower switching device SL is removed. Specifically, in the first transition from the low temperature condition to the high temperature condition, one pulse LPc of the gate signal GL is removed immediately after the temperature signal S1 exceeds a threshold temperature T0c at a time tc, and the switching speed and the dead-time are changed at the same time during a time period where the pulse LPc is removed. In contrast, in the second transition from the high temperature condition to the low temperature condition, one pulse LPd of the gate signal GL is removed immediately after the temperature signal S1 falls below a threshold temperature T0d at a time td, and the switching speed and the dead-time are changed at the same time during a time period where the pulse LPd is removed. It is noted that a waveform of a voltage applied to the motor M is not affected by the removal of the pulse of the gate signal GL, when the pulse of the gate signal GL is removed during a current phase where the diode DL is energized so that the lower switching device SL can be de-energized. The same operation can be achieved by removing a pulse of the gate signal GU applied to the upper switching device SH during a current phase where the diode DH is energized.

Figure 12:
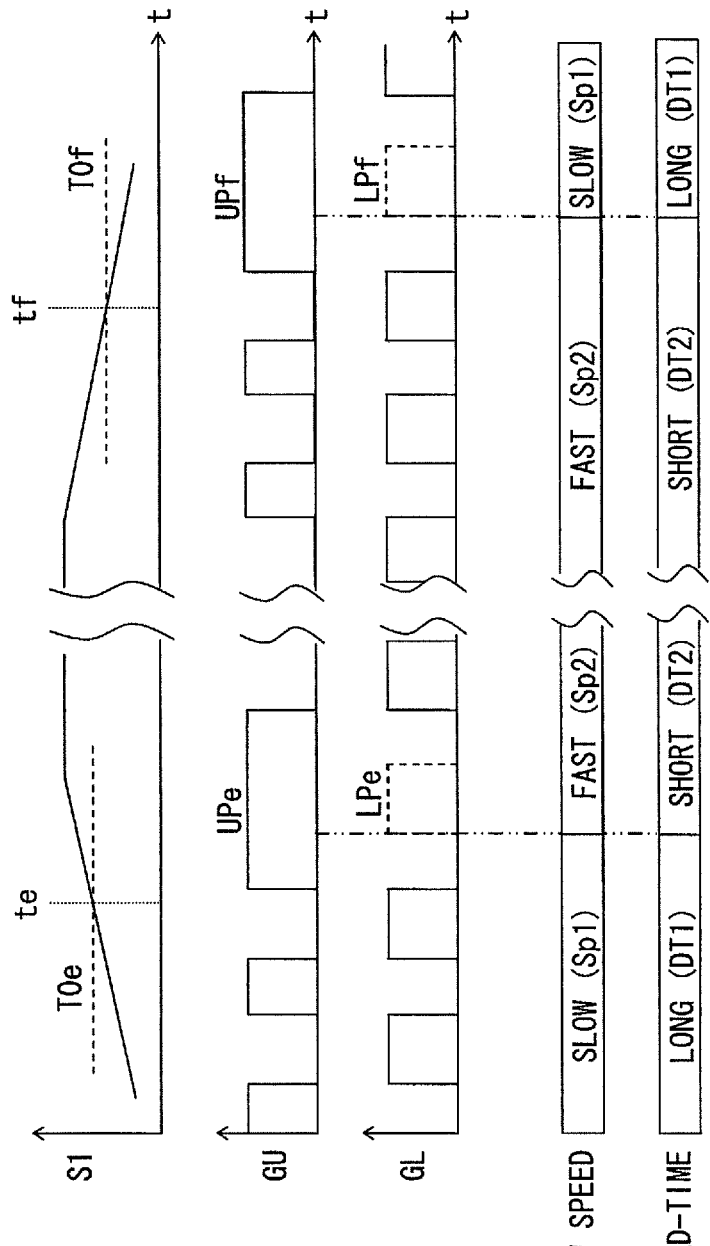
FIG. 12 is a timing chart of a third example of a control method to change the switching speed and the dead-time.

FIG. 12 shows a third example of the control method to change the switching speed and the dead-time.

As indicated by a dashed two-dotted line in FIG. 12, according to the third example, the switching speed and the dead-time are changed at the same timing during a time period where one pulse of the gate signal GL supplied to the lower switching device SL is removed. Specifically, in the first transition from the low temperature condition to the high temperature condition, one pulse LPe of the gate signal GL is removed immediately after the temperature signal S1 exceeds a threshold temperature T0e at a time te. Further, the gate signal GU supplied to the upper switching device SU is kept ON during an OFF period of the gate signal GL so that a width of a pulse UPe of the gate signal GU can be tripled. The switching speed and the dead-time are changed at the same time during a time period where the width of the pulse UPe of the gate signal GU is tripled. In contrast, in the second transition from the high temperature condition to the low temperature condition, one pulse LPf of the gate signal GL is removed immediately after the temperature signal S1 falls below a threshold temperature T0f at a time tf. Further, the gate signal GU is kept ON during an OFF period of the gate signal GL so that a width of a pulse UPf of the gate signal GU can be tripled. The switching speed and the dead-time are changed at the same time during a time period where the width of the pulse UPf of the gate signal GU is tripled. In an example shown in FIG. 12, the pulse of the gate signal GL is removed. Alternatively, the pulse of the gate signal GU can be removed.

As described above, according to the second and third examples shown in FIGS. 11 and 12, the pulse of at least one of the gate signal GU and the gate signal GL is removed when the temperature signal S1 changes across the threshold value, and the switching speed and the dead-time are changed during a time period where the pulse is removed. In such an approach, a short-circuit in the DC power supply E can be surely prevented.

Figure 13:
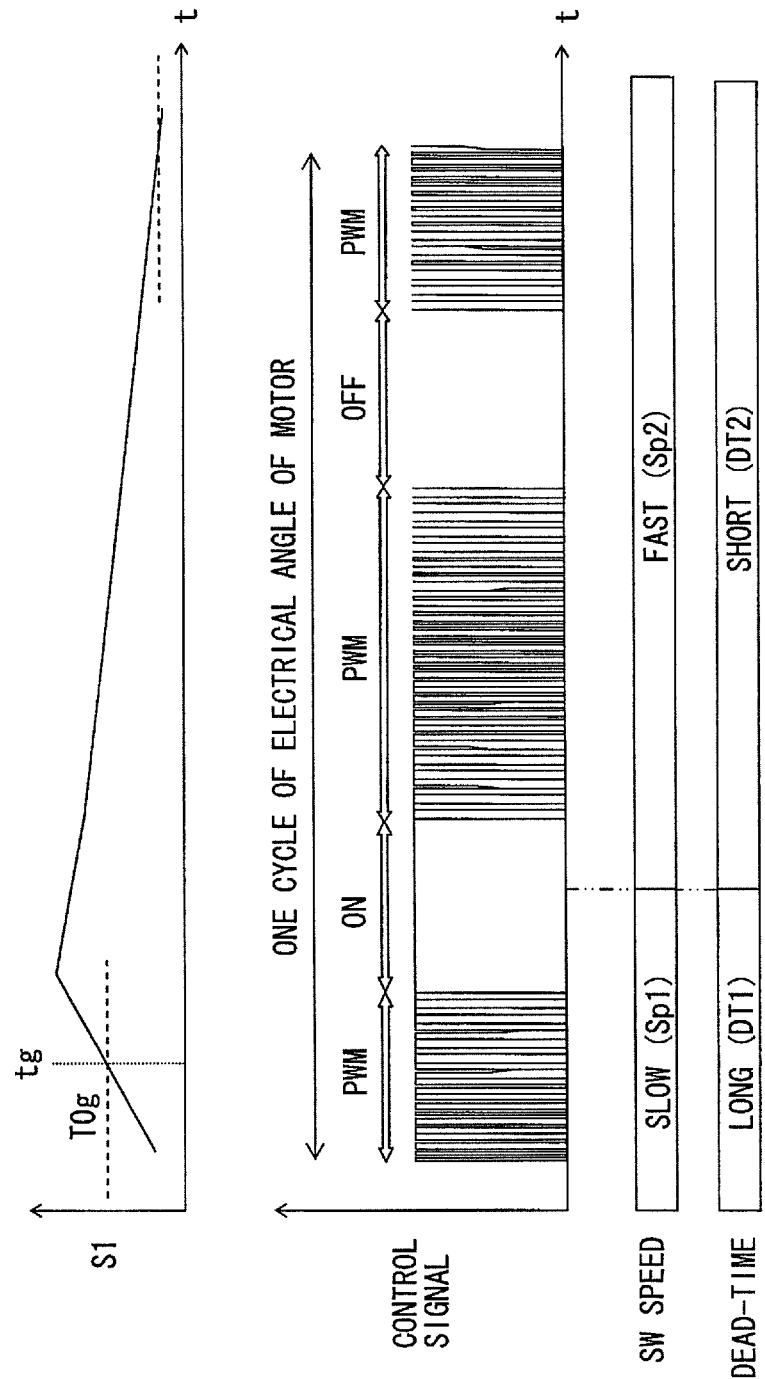
FIG. 13 is a timing chart of a fourth example of a control method to change the switching speed and the dead-time.

FIG. 13 shows a fourth example of the control method to change the switching speed and the dead-time. The fourth example is designed for a case where the motor M is driven by a two-phase modulation method.

As shown in FIG. 13, in a two-phase modulation method, a control signal has a PWM period, a continuous ON period, and a continuous OFF period during one cycle of an electrical angle of the motor M. In this case, it is preferable that the switching speed and the dead-time are changed during a period other than the PWM period. In an example shown in FIG. 13, after the temperature signal S1 exceeds a threshold temperature T0g at a time tg, the switching speed and the dead-time are changed at the same time during the continuous ON period of the control signal. In such an approach, a short-circuit in the DC power supply E can be surely prevented.

In the first to fourth examples shown in FIGS. 10-13, it is preferable that the change timing at which the switching speed and the dead-time are changed should be set to the center of an ON period or an OFF period of the gate signals GU or GL. In such an approach, a short-circuit in the DC power supply E can be prevented more surely.

Second Embodiment

Figure 14:
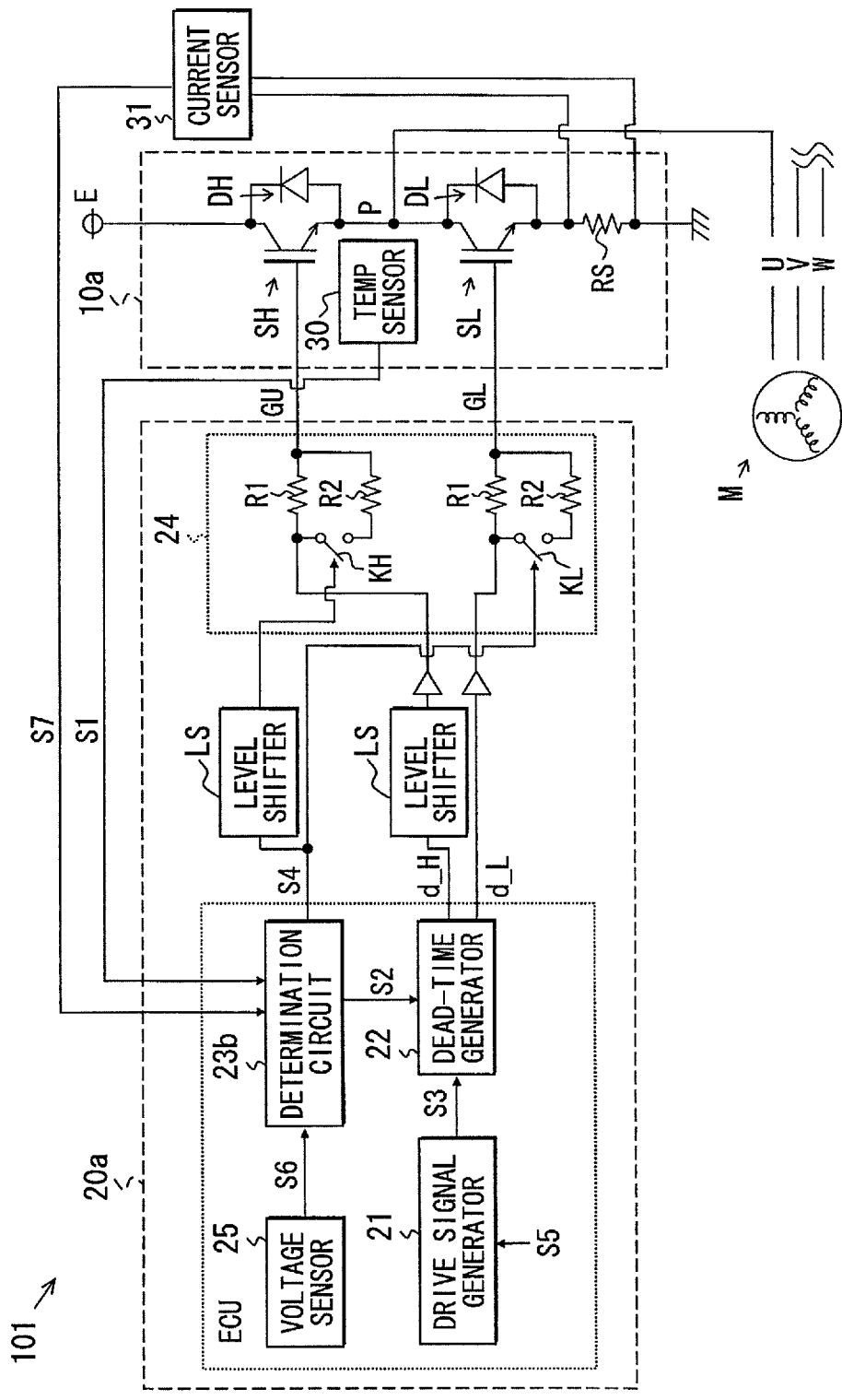
FIG. 14 is a block diagram of a power converter according to a second embodiment of the present disclosure.

FIG. 14 illustrates a block diagram of a power converter 101 according to a second embodiment of the present disclosure. Differences between the first embodiment and the second embodiment are as follows.

As can be seen by comparing FIGS. 1 and 14, the power converter 101 further includes a voltage sensor 25 for detecting an input voltage from the DC power source E. For example, the voltage sensor 25 can be incorporated in an ECU of a gate control circuit 20a. The voltage sensor 25 outputs an input voltage signal S6, indicative of the detected input voltage, to a determination circuit 23b of the gate control circuit 20a.

In an output circuit 10a of the power converter 101, a shunt resistor Rs is inserted in a series circuit of the upper and lower switching devices SH and SL. The power converter 101 further includes a current sensor 31 for detecting an electric current (i.e., load current) flowing through the series circuit by detecting a voltage across the shunt resistor Rs. The current sensor 31 outputs a current signal S7, indicative of the detected current, to the determination circuit 23a. The determination circuit 23b sets the switching speed and the dead-time based on the temperature signal S1 from the temperature sensor 30, the input voltage signal S6 from the voltage sensor 25, and the current signal S7 from the current sensor 31.

Generally, in a power converter used for a system of a vehicle, an input voltage has a large amount of variation. Therefore, assuming that a motor is designed to perform a required operation at a predetermined input voltage, the maximum input voltage is enough to allow the motor to perform the required operation, but the minimum input voltage may be insufficient to allow the motor to perform the required operation. The voltage sensor 25 of the power converter 101 is used to optimize the switching speed and the dead-time, when the input voltage has a large amount of variation.

Specifically, in a high voltage condition where the input voltage from the DC power source E is higher than a predetermined reference voltage, the switching speed is set to a slower speed, and the dead-time is set to a longer time length. In contrast, in a low voltage condition where the input voltage is not higher than the reference voltage, the switching speed is set to a faster speed, and the dead-time is set to a shorter time length.

FIG. 15A shows necessary characteristics of the upper and lower switching devices SU and SL to drive the motor M on the input voltage from the DC power source E.

A modulation factor of the power converter 101 is defined as a ratio of a line voltage applied to the motor M to the input voltage. When the input voltage is low, a large modulation factor is necessary to cause the motor M to produce the same RPM and torque as when the input voltage is high. A conduction loss of the motor M increases in proportion to the modulation factor, when the same torque is outputted. An allowable switching loss decreases with an increase in the conduction loss at the same ambient temperature.

Based on the necessary characteristics shown in FIG. 15A, according to the second embodiment, the switching speed and the dead-time of the switching devices SH and SL are set as shown in FIG. 15B. That is, as mentioned above, in the high voltage condition where the input voltage is higher than a predetermined reference voltage, the switching speed is set to a slower speed, and the dead-time is set to a longer time length. In contrast, in a low voltage condition where the input voltage is not higher than the reference voltage, the switching speed is set to a faster speed, and the dead-time is set to a shorter time length.

As shown in FIG. 15A, in the low voltage condition, since the allowable switching loss is small, the switching speed is set to a faster speed to reduce the switching speed. Further, in the low voltage condition, since a required modulation factor is large, the dead-time is set to a shorter time length to increase a modulation factor. In such an approach, as described later with reference to FIGS. 16A and 16B, an available RPM-torque range is expanded. In contrast, in the high voltage condition, since an allowable surge voltage is small, the switching speed is set to a slower speed to reduce a surge voltage. Disadvantages of setting the switching speed to a slower speed are that the switching loss is increased and the modulation factor is reduced. However, as described later with reference to FIGS. 16A and 16B, the switching loss and the modulation factor have large margins in the high voltage condition. Therefore, the disadvantages are no big deal. However, depending on system configurations such as a PWM frequency and a modulation method, there is a possibility that a ratio of the switching loss to the conduction loss becomes large. Further, since the switching loss increases in proportion to the input voltage at the same switching speed, a margin of the switching loss may become small in the high voltage condition. Even in such a case, the available RPM-torque range can be expanded in the low voltage condition by changing the switching speed and the dead-time.

Figures 16A, 16B:
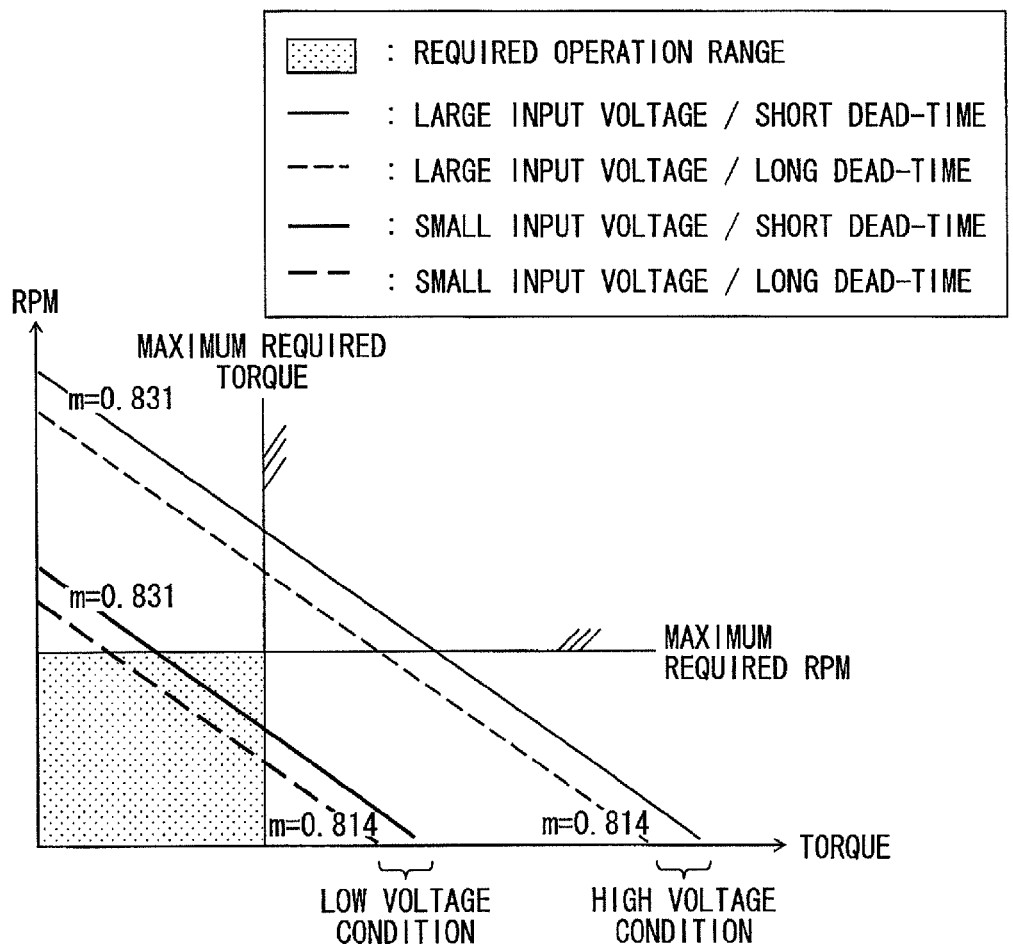
FIGS. 16A and 16B are diagrams showing a result of an experiment performed by an inventor to evaluate effects of the settings shown in FIG. 15B.

FIGS. 16A and 16B show a result of an experiment performed by the inventor to evaluate effects of the setting shown in FIG. 15B.

The experiment is conducted under a condition that the PWM frequency is set to 20 kHz (i.e., period is 50 μs). In a three-phase modulation method, when a dead-time is zero, a theoretical voltage utilization factor is 0.866 (=√3/2). As shown in FIG. 16A, when the dead-time is 3 μs, a voltage utilization factor corresponding to the maximum modulation factor is 0.814(=0.866×(50−3)/50), and when the dead-time is 2 μs, the voltage utilization factor is 0.831(=0.866×(50−2)/50).

As shown in FIG. 16B, in the high voltage condition where the allowable surge voltage is small, since the input voltage is enough to allow the motor M to perform the required operation, the switching speed is set to a slower speed to reduce a surge voltage. In contrast, in the low voltage condition, the input voltage may be insufficient to allow the motor M to perform the required operation. Therefore, the switching speed is set to a faster speed, and the dead-time is set to a shorter speed to increase the modulation factor. In this way, according to the second embodiment, the switching speed and the dead-time are set based on the input voltage so that the available RPM-torque range can be expanded.

Figures 17A, 17B, 18:
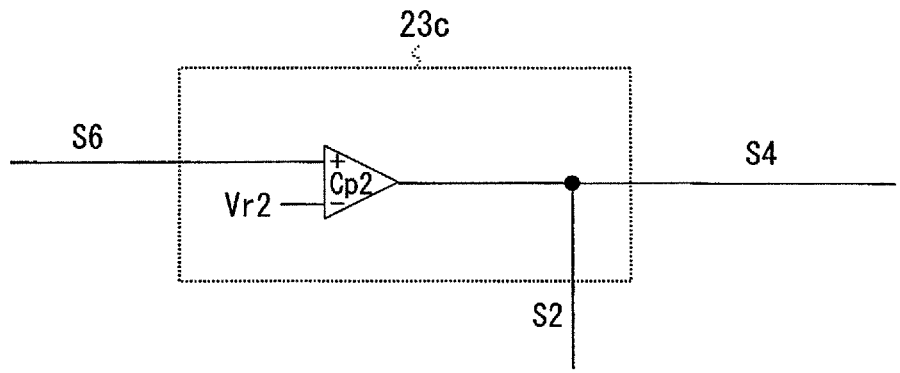
FIG. 17A is a diagram showing a first specific example of a determination circuit shown in FIG. 14.
FIG. 17B is a diagram showing a relationship between an output of a comparator and the settings of the switching speed and the dead-time.
FIG. 18 is a diagram showing characteristics of the switching devices on a load current.

FIG. 17A illustrates a determination circuit 23c as a first specific example of the determination circuit 23b shown in FIG. 14.

As shown in FIG. 17A, the determination circuit 23c includes a comparator Cp2 only. The comparator Cp2 makes a comparison between the input voltage signal S6 outputted from the voltage sensor 25 and a predetermined reference voltage Vr2. The comparator Cp2 outputs a logic high signal or a logic low signal based on a result of the comparison. Specifically, when the input voltage signal S6 is not higher than the reference voltage Vr2, the comparator Cp2 outputs a logic low signal, and when the input voltage signal S6 is higher than the reference voltage Vr2, the comparator Cp2 outputs a logic high signal. An output signal of the comparator Cp2 is outputted as the switching speed change signal S4 and the dead-time change signal S2 from the determination circuit 23c.

As shown in FIG. 17B, when the comparator Cp2 outputs a logic low signal, the switching speed is set to a faster speed, and the dead-time is set to a shorter time length. In contrast, when the comparator Cp2 outputs a logic high signal, the switching speed is set to a slower speed, and the dead-time is set to a longer time length. Thus, as shown in FIG. 15B, in the low voltage condition, the switching speed is set to a faster speed, and the dead-time is set to a shorter time length. In contrast, in the high voltage condition, the switching speed is set to a slower speed, and the dead-time is set to a longer time length.

As mentioned above, the power converter 101 includes the current sensor 31 for detecting the load current flowing through the series circuit of the switching devices SU and SL. According to the second embodiment, the switching speed and the dead-time can be set based on the current signal S7 outputted from the current sensor 31.

FIG. 18 shows characteristics of the switching devices SU and SL on the load current.

The switching devices SU and SL can be controlled based on the combination of the temperature signal S1 and the input voltage signal S6 by taking into account of the characteristics shown in FIG. 18.

For example, as shown in FIG. 18, when the load current is large, loss of the switching devices SU and SL is large. Therefore, if the temperature of the switching devices SU and SL is high when the load current is large, it is effective to increase the switching speed in order to reduce the loss. Further, when the load current is large, an allowable surge voltage is small. Therefore, if the temperature of the switching devices SU and SL is low or if the input voltage is high when the load current is large, it is effective to reduce the switching speed in order to reduce a surge voltage.

If the switching devices SU and SL have enough margin of an allowable surge voltage, the switching speed can be increased with an increase in the load current regardless of the temperature of the switching devices SU and SL and the input voltage. In contrast, if the switching devices SU and SL have enough margin of thermal tolerance, the switching speed can be reduced with an increase in the load current.

As it is well known, a ringing phenomenon occurs if the diodes DH and DL recover under a condition that a small amount of current flows through the diodes DH and DL. The ringing phenomenon can be prevented by increasing the gate resistances of the switching devices SU and SL when the load current is small. In this case, for example, the gate resistances can be increased only when the switching devices SU and SL are turned ON.

Likewise, the switching speed can be changed only when the switching devices SU and SL are turned ON or OFF. Further, the switching speed can be changed in a different manner (e.g., difference threshold or different logic) between the turn-ON and the turn-OFF of the switching devices SU and SL.

Figures 19A, 19B:
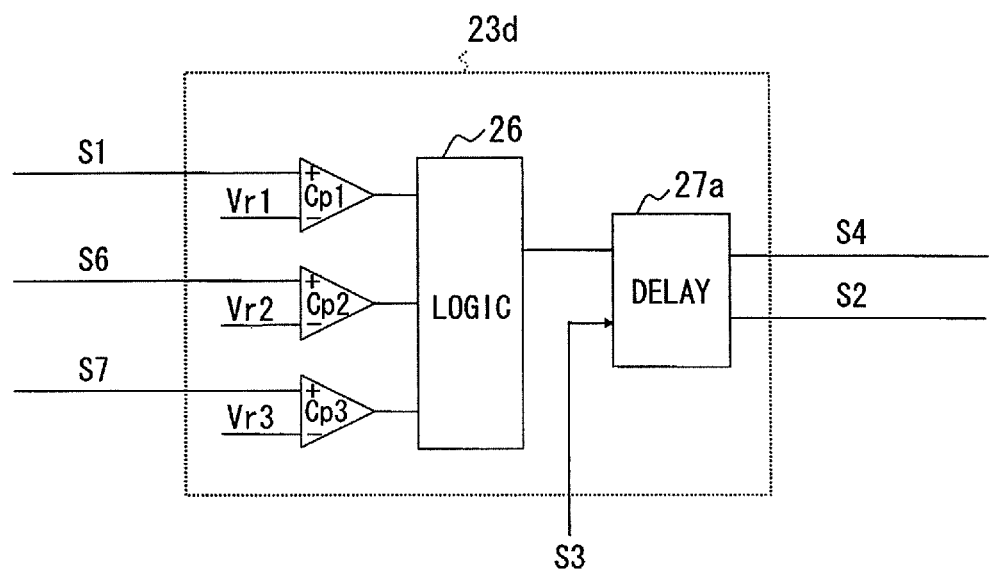
FIG. 19A is a diagram showing a second specific example of the determination circuit shown in FIG. 14.
FIG. 19B is a diagram showing a relationship between an output of a logic circuit and the settings of the switching speed and the dead-time.

FIG. 19A illustrates a determination circuit 23d as a second specific example of the determination circuit 23b shown in FIG. 14. The determination circuit 23d sets the switching speed and the dead-time based on all of the temperature signal S1, the input voltage signal S6, and the current signal S7.

The determination circuit 23d includes a comparator Cp3 in addition to the comparators Cp1 and Cp2. The comparator Cp3 makes a comparison between the current signal S7 and a predetermined reference voltage Vr3 corresponding to a predetermined reference current. The comparator Cp3 outputs a logic high signal or a logic low signal based on a result of the comparison. Specifically, when the current signal S7 is not higher than the reference voltage Vr3, the comparator Cp3 outputs a logic low signal, and when the current signal S7 is higher than the reference voltage Vr3, the comparator Cp3 outputs a logic high signal.

The determination circuit 23d further includes a logic circuit 26. The logic circuit 26 performs a predetermined logical operation of the output signals from the comparators Cp1, Cp2, and Cp3 and outputs a logic high signal or a logic low signal based on a result of the logical operation.

As shown in FIG. 19B, when the logic circuit 26 outputs a logic low signal, the switching speed is set to a faster speed, and the dead-time is set to a shorter time length, and when the logic circuit 26 outputs a logic high signal, the switching speed is set to a slower speed, and the dead-time is set to a longer time length. Alternatively, when the logic circuit 26 outputs a logic low signal, the switching speed can be set to a slower speed, and the dead-time can be set to a longer time length, and when the logic circuit 26 outputs a logic high signal, the switching speed can be set to a faster speed, and the dead-time can be set to a shorter time length. Further, the comparators Cp1, Cp2, and Cp3 can be replaced with an A/D converter. Further, the logic circuit 26 can output two or more bits to change the switching speed and the dead-time in two or more levels.

The determination circuit 23d further includes a delay circuit 27a. An output signal of the logic circuit 26 is inputted to the delay circuit 27a. Further, the PWM signal S3 outputted from the drive signal generator 21 is inputted to the delay circuit 27a. The delay circuit 27a outputs the switching speed change signal S4 and the dead-time change signal S2 synchronously with the center of the pulse of the PWM signal S3. Instead of the PWM signal S3, a signal having the same phase as the PWM signal S3 can be inputted to the delay circuit 27a. For example, a carrier signal (e.g., triangular wave signal) used to generate the PWM signal S3 can be inputted to the delay circuit 27a.

In this way, the determination circuit 23d outputs the switching speed change signal S4 and the dead-time change signal S2 synchronously with the center of the pulse of the PWM signal S3. The switching speed change signal S4 and the dead-time change signal S2 are inputted to the switching speed switcher 24 and the dead-time generator 22, respectively.

FIG. 20A illustrates a determination circuit 23e as a third specific example of the determination circuit 23b shown in FIG. 14.

A difference between the determination circuit 23d shown in FIG. 19A and the determination circuit 23e shown in FIG. 20A is that the determination circuit 23e includes delay circuits 27b and 27c instead of the delay circuit 27a. The delay circuit 27b outputs the switching speed change signal S4, and the delay circuit 27c outputs the dead-time change signal S2.

In the determination circuit 23e, a large amount of delay is added to one of the switching speed change signal S4 and the dead-time change signal S2 to achieve a stable operation without using the PWM signal S3. For example, when the output signal of the logic circuit 26 changes from a logic high level to a logic low level, a larger amount of delay (e.g., equivalent to one PWM signal) can be added to the dead-time change signal S2. In such an approach, the switching speed is changed to a faster speed before the dead-time is changed to a shorter time length. In contrast, when the output signal of the logic circuit 26 changes from a logic low level to a logic high level, a larger amount of delay (e.g., equivalent to one PWM signal) can be added to the switching speed change signal S4. In such an approach, the switching speed is changed to a slower speed after the dead-time is changed to a longer time length.

FIG. 21A illustrates a logic circuit 26a as a first specific example of the logic circuit 26 shown in FIGS. 19A and 20A.

The logic circuit 26a includes an NOT gate 15 and an AND gate AN5 with two inputs. The logic circuit 26a sets the switching speed and the dead-time based on the temperature signal S1 and the input voltage signal S6 in accordance with a logic table shown in FIG. 21B. The logic table shown in FIG. 21B is designed for the hardest allowable surge voltage. That is, according to the logic table shown in FIG. 21B, only when the temperature signal S1 is lower than the reference voltage Vr1, and the input voltage signal S6 is higher than the reference voltage Vr2, an output signal OUT of the AND gate AN5 becomes a logic high so that the switching speed can be set to a slower speed. It is noted that when the switching speed is set to a slower speed, the dead-time is set to a longer time length.

Figures 22A, 22B:
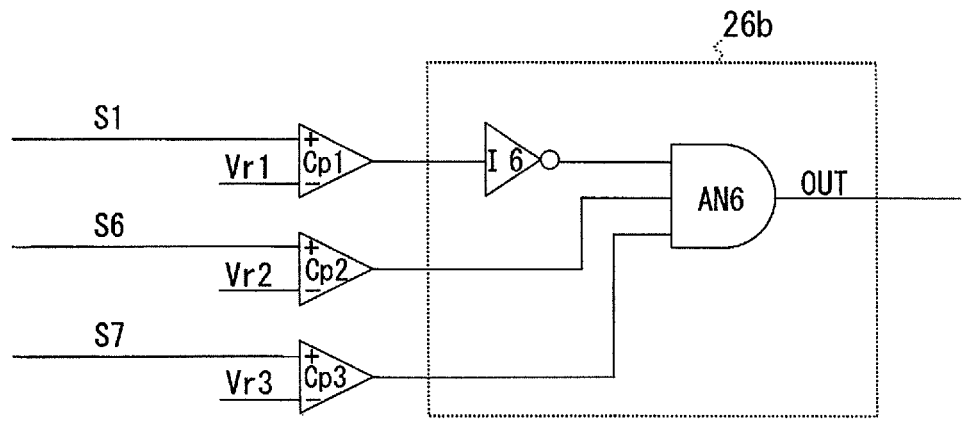
FIG. 22A is a diagram showing a second specific example of the logic circuit shown in FIGS. 19A and 20A.
FIG. 22B is a diagram showing a logic table of the logic circuit shown in FIG. 22A.

FIG. 22A illustrates a logic circuit 26b as a second specific example of the logic circuit 26 shown in FIGS. 19A and 20A.

The logic circuit 26b includes an NOT gate 16 and an AND gate AN6 with three inputs. The logic circuit 26b sets the switching speed and the dead-time based on the temperature signal S1, the input voltage signal S6, and the current signal S7 in accordance with a logic table shown in FIG. 22B. The logic table shown in FIG. 22B is designed for the hardest allowable surge voltage. That is, according to the logic table shown in FIG. 22B, only when the temperature signal S1 is lower than the reference voltage Vr1, the input voltage signal S6 is higher than the reference voltage Vr2, and the current signal S7 is higher than the reference voltage Vr3, an output signal OUT of the AND gate AN6 becomes a logic high so that the switching speed can be set to a slower speed. It is noted that when the switching speed is set to a slower speed, the dead-time is set to a longer time length.

As described above, according to the second embodiment, the power converter 101 can achieve a stable and efficient operation without increases in size and cost.

For example, the power converters 100 and 101 according to the embodiments can be used as an inverter for converting DC power to AC power. Further, since the power converters 100 and 101 can have a small size and achieve a stable and efficient operation even in severe environments, the power converters 100 and 101 can be suitably used in a vehicle.

Modifications

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

For example, the switching devices SH and SL are not limited to MOSFETs. Further, the pulse-modulated gate signals GU and GL are not limited to pulse-width modulation (PWM) signals. For example, the pulse-modulated gate signals GU and GL can be pulse-frequency modulation (PFM) signals.

What is claimed is:

1. A power converter comprising:
   an output circuit including a upper switching device connected to a direct-current power source and a lower switching device connected in series with the upper switching device, the output circuit configured to supply power to a load from a connection point between the switching devices; and
   a control circuit configured to supply pulse-modulated control signals to the switching devices to turn ON and OFF the switching devices; and
   a temperature sensor configured to detect a temperature of each switching device, wherein
   the control circuit variably sets a switching speed and a dead-time of the switching devices, the dead-time being defined as a time period where both of the switching devices are kept OFF,
   when the switching speed is set to a first speed, the dead-time is set to a first time length,
   when the switching speed is set to a second speed faster than the first speed, the dead-time is set to a second time length shorter than the first time length,
   when the temperature is lower than a predetermined threshold temperature, the switching speed is set to the first speed, and the dead-time is set to the first time length, and
   when the temperature is not lower than the threshold temperature, the switching speed is set to the second speed, and the dead-time is set to the second time length.

2. The power converter according to claim 1, wherein
   when the temperature increases from below to above the threshold temperature, the switching speed is changed from the first speed to the second speed before the dead-time is changed from the first time length to the second time length, and
   when the temperature decreases from above to below the threshold temperature, the switching speed is changed from the second speed to the first speed after the dead-time is changed from the second time length to the first time length.

3. The power converter according to claim 1, wherein
   the threshold temperature includes a first threshold temperature and a second threshold temperature different from the first threshold temperature,
   when the temperature increases from below to above the first threshold temperature, the switching speed is changed from the first speed to the second speed, and the dead-time is changed from the first time length to the second time length, and
   when the temperature decreases from above to below the second threshold temperature, the switching speed is changed from the second speed to the first speed, and the dead-time is changed from the second time length to the first time length.

4. The power converter according to claim 1, further comprising:
   a voltage sensor configured to detect a voltage inputted from the direct-current power source, wherein
   the switching speed and the dead-time are changed based on the voltage.

5. The power converter according to claim 1, further comprising:
   a current sensor configured to detect a current flowing through the switching devices, wherein
   the switching speed and the dead-time are changed based on the current.

6. The power converter according to claim 1, wherein
   the switching speed and the dead-time are changed at different timings corresponding to one pulse of the pulse-modulated control signals.

7. The power converter according to claim 1, wherein
   the switching speed and the dead-time are changed during a time period where a pulse of at least one of the pulse-modulated control signals is removed.

8. The power converter according to claim 1, wherein
   the power is supplied to the load by a two-phase modulation method, and
   the switching speed and the dead-time are changed during a time period where the pulse-modulated control signals are not modulated.

9. The power converter according to claim 1, wherein
   the switching speed and the dead-time are changed synchronously with the center of an ON period or an OFF period of the pulse-modulated control signals.

10. The power converter according to claim 1, wherein
    the switching speed is changed by changing input resistances of the switching devices.

11. The power converter according to claim 1, wherein
    the output circuit is configured as an inverter for converting direct-current power to alternating-current power.

* * * * *